US012808399B2

(12) United States Patent

Svensson et al.

(10) Patent No.: US 12,808,399 B2

(45) Date of Patent: Nov. 24, 2026

(54) JOINERY PRODUCT WITH A MECHANICAL LOCKING DEVICE

(71) Applicant: VÄLINGE INNOVATION AB, Viken (SE)

(72) Inventors: Johan Svensson, Kattarp (SE); Peter Derelöv, Helsingborg (SE)

(73) Assignee: VÄLINGE INNOVATION AB, Viken (SE)

(*) Notice: Subject to any disclaimer, the term of this patent is extended or adjusted under 35 U.S.C. 154(b) by 197 days.

(21) Appl. No.: 18/312,808

(22) Filed: May 5, 2023

(65) Prior Publication Data

US 2024/0018986 A1 Jan. 18, 2024

(30) Foreign Application Priority Data

Jul. 18, 2022 (SE) .................................. 2250920-2

(51) Int. Cl.

*F16B 12/24* (2006.01)
*A47B 47/00* (2006.01)
(Continued)

(52) U.S. Cl.

CPC .......... *F16B 12/24* (2013.01); *A47B 47/0075* (2013.01); *F16B 12/26* (2013.01);
(Continued)

(58) Field of Classification Search

CPC .............. A47B 47/0075; A47B 47/042; A47B 2230/0037; F16B 12/24; F16B 12/26; F16B 12/46; F16B 2012/103; F16B 12/20

See application file for complete search history.

(56) References Cited

U.S. PATENT DOCUMENTS 11,445,819 B2 * 9/2022 Derelöv ............... A47B 47/042
12,025,162 B2 * 7/2024 Svensson ............... F16B 12/46
(Continued)

FOREIGN PATENT DOCUMENTS

CA 3098285 A1 * 10/2019 .......... B67D 1/0832
EP 3730807 A1 10/2020
(Continued)

OTHER PUBLICATIONS

U.S. Appl. No. 18/729,224, filed Jul. 16, 2024, Johan Svensson.
(Continued)

*Primary Examiner* — Kimberley S Wright

(74) *Attorney, Agent, or Firm* — Boone IP Law

(57) ABSTRACT

A joinery product including a first joinery element having a first attaching surface, a second joinery element having a second attaching surface, and a mechanical locking device. The mechanical locking device includes at least two dowels protruding at a first angle from the first attaching surface and at least two insertion recesses extending into the second attaching surface. The least two insertion recesses are configured to receive the at least two dowels. The mechanical locking device further contains a compressible locking element in a first joinery element recess in the first attaching surface. The compressible locking element, in the uncompressed state, partially protrudes from first attaching surface. The mechanical locking device further includes a locking recess at the second attaching surface configured to receive the compressible locking element.

29 Claims, 21 Drawing Sheets

(51) Int. Cl.

| | |
|---|---|
| ***A47B 47/04*** | (2006.01) |
| ***F16B 12/26*** | (2006.01) |
| *F16B 12/10* | (2006.01) |
| *F16B 12/36* | (2006.01) |
| *F16B 12/38* | (2006.01) |

(52) U.S. Cl.

CPC . *A47B 2230/0037* (2013.01); *F16B 2012/103* (2013.01); *F16B 12/36* (2013.01); *F16B 12/38* (2013.01)

(56) References Cited

U.S. PATENT DOCUMENTS

| | | | | |
|---|---|---|---|---|
| 2013/0048632 | A1* | 2/2013 | Chen | B65D 11/1873 220/4.33 |
| 2020/0069048 | A1* | 3/2020 | Derelöv | A47B 47/042 |
| 2020/0069049 | A1* | 3/2020 | Derelöv | A47B 47/042 |
| 2020/0340513 | A1* | 10/2020 | Derelöv | F16B 12/26 |
| 2021/0262507 | A1* | 8/2021 | Svensson | F16B 12/46 |
| 2021/0262508 | A1* | 8/2021 | Svensson | F16B 12/20 |
| 2023/0148747 | A1* | 5/2023 | Derelöv | A47B 47/042 403/188 |

FOREIGN PATENT DOCUMENTS

| | | | | |
|---|---|---|---|---|
| EP | 3871559 | A1 | 9/2021 | |
| GB | 0245332 | A | 1/1926 | |
| WO | 2015/038059 | A1 | 3/2015 | |
| WO | 2019203720 | A1 | 10/2019 | |
| WO | WO-2020216852 | A1 * | 10/2020 | A47B 47/042 |

OTHER PUBLICATIONS

U.S. Appl. No. 18/764,217, filed Jul. 4, 2024, Thomas Meijer.
U.S. Appl. No. 16/553,350, filed Aug. 28, 2019, Peter Derelöv.
U.S. Appl. No. 16/856,765, filed Apr. 23, 2020, Peter Derelöv.
U.S. Appl. No. 17/173,823, filed Feb. 11, 2021, Peter Derelöv.
U.S. Appl. No. 17/185,428, filed Feb. 25, 2021, Johan Svensson.
U.S. Appl. No. 17/185,403, filed Feb. 25, 2021, Johan Svensson.
U.S. Appl. No. 17/370,521, filed Jul. 8, 2021, Christian Boo.
U.S. Appl. No. 17/588,733, filed Jan. 31, 2022, Peter Derelöv.
U.S. Appl. No. 17/674,262, filed Feb. 17, 2022, Johan Svensson.
U.S. Appl. No. 17/709,994, filed Mar. 31, 2022, Johan Svensson.
U.S. Appl. No. 17/710,055, filed Mar. 31, 2022, Johan Svensson.
U.S. Appl. No. 17/883,203, filed Aug. 8, 2022, Christian Boo.
U.S. Appl. No. 17/886,517, filed Aug. 12, 2022, Peter Derelöv.
U.S. Appl. No. 18/191,444, filed Mar. 28, 2023, Johan Svensson.
U.S. Appl. No. 18/383,242, filed Oct. 24, 2023, Peter Derelöv.
Office Action received for Swedish Patent Application No. 2250920.2, mailed on Feb. 17, 2023, 11 pages.
U.S. Appl. No. 18/983,417, filed Dec. 17, 2024, Thomas Meijer.
U.S. Appl. No. 19/093,758, filed Mar. 28, 2025, Peter Derelöv.
Extended European Search Report mailed by the European Patent office in Application No. EP 23843463.3 and dated Jun. 9, 2026, 10 pages.
U.S. Appl. No. 19/695,149, filed Jun. 2, 2026, Johan Svensson.
U.S. Appl. No. 19/698,092, Marko Sostar.

* cited by examiner

JOINERY PRODUCT WITH A MECHANICAL LOCKING DEVICE

CROSS REFERENCE TO RELATED APPLICATIONS

The present application claims the benefit of Swedish Application No. 2250920-2, filed on Jul. 18, 2022. The entire contents of Swedish Application No. 2250920-2 are hereby incorporated herein by reference in their entirety.

TECHNICAL FIELD OF THE INVENTION

The invention relates to a joinery product.

BACKGROUND OF THE INVENTION

A furniture product provided with a mechanical locking device is known in the art, as evidenced by WO2015/038059. The furniture product comprises a first panel connected to a second panel by a mechanical locking device comprising a rod-shaped element, an insertion groove, a locking groove, and a locking device.

There is a need for a joinery product of joinery elements with a stronger locking.

SUMMARY OF THE INVENTION

One object of the invention is to alleviate or mitigate, at least in part the drawbacks of the prior art.

One object of the invention is to provide a joinery product with a stronger and versatile locking.

According to first aspect of the invention, there is provided a joinery product comprising a first joinery element having a first edge surface, a second edge surface and a first joinery element surface, wherein said second edge surface is adjacent to said first edge surface and wherein a first attaching surface is at least part of said first edge surface or said second edge surface. The joinery product further comprises a second joinery element having a second joinery element surface, a third joinery element surface, a third edge surface and a fourth edge surface, wherein a second attaching surface is at least part of said second joinery element surface, the third edge surface or the fourth edge surface, wherein the first attaching surface faces and is configured to be locked with the second attaching surface. The joinery product further comprises a mechanical locking device comprising at least two dowels protruding at a first angle from the first attaching surface and at least two insertion recesses extending into the second attaching surface, said at least two insertion recesses being configured to receive said at least two dowels. The mechanical locking device further comprises a compressible locking element positioned partially in a first joinery element recess in the first attaching surface, wherein a side of the joinery element recess extends at a third angle (a3) relative the first attaching surface, and wherein the compressible locking element in the uncompressed state partially protrudes from first attaching surface. The mechanical locking device further comprises a locking recess at the second attaching surface being configured to receive said compressible locking element. A locking surface of said locking recess in the locked position is configured to cooperate with the compressible locking element for locking of the first joinery element relative to the second joinery element in directions in the plane of the first attaching surface. The inclination of said at least two dowels counteracts displacement of the first joinery element relative to the second joinery element along the normal direction of the first attaching surface. The compressible locking element is positioned between said at least two dowels in a direction perpendicular to the normal direction, wherein the first angle (a1) is in a range of 20-75 degrees, and wherein the third angle (a3) is in a range of 70-110°. The positioning of the compressible locking element between the at least two dowels in a direction perpendicular to the normal direction allows for a stronger locking. This allows for using a larger first angle a1 and or second angle i.e., a less inclined dowel. For example, when the compressible locking element is between the at least two dowels, one of the at least two dowels may be placed closer to an edge of the first attaching surface. Each inclined dowel counteracts displacement of the first joinery element relative to the second joinery element along the normal direction of the first attaching surface i.e., each inclined dowel presses the joinery elements together. Thus, the positioning of a dowel close to an edge of the first attaching surface may prevent a gap from appearing. Such a gap could emerge as a consequence of an exterior force and/or by a force exerted by the compressible element.

One or more of the at least two dowels may be placed less than 125 mm, such as less than mm, such as less than 50 mm from any edge of the first attaching surface. The edge may be any edge of the first edge surface but is typically the side edge closest to the dowel which is inclined away from the same side edge. The position of the dowel may be measured as the distance between the centre line of the dowel that is inclined away from the side edge and the side edge.

As used herein, the first joinery element recess means a recess in the first joinery element.

The joinery product may be a piece of furniture, a door frame or a window frame.

The first and/or the second joinery element may be a panel or a board.

The at least two insertion recesses extend into the second attaching surface at a second angle (a2) from the second attaching surface and the difference between the first angle (a1) and the second angle (a2) may be in a range of 0 to 6 degrees, such as in a range of 1 to 5 degrees, such as in a range of 2 to 4 degrees, such as about 3 degrees.

The compressible locking element may be positioned less than 30 mm, such as less than 20 mm, such as less than 10 mm, such as less than 5 mm, from a straight line between said at least two dowels.

The first angle a1 may be in a range of 30-60 degrees, such as in a range of 35-55 degrees, such as in a range of 40-50 degrees, such as about 45 degrees.

The third angle a3 may be in a range of 75-105 degrees, such as in a range of 80-100 degrees, such as in a range of 85-95 degrees, such as about 90 degrees.

The difference between the angle a1 and a3 may be at least 10 degrees, such as at least 20 degrees.

The difference between the angle a1 and a3 may be 10-100 degrees, such as 20-70 degrees, such as 30-60 degrees, such as 40-50 degrees, such as about 45 degrees or about 42 degrees.

The compressible locking element, in a flexed/compressed state, may be configured to be substantially positioned in the first joinery element recess.

The compressible locking element may be, in the locked position, configured to be displaced partly into the locking recess.

The at least two insertion recesses may be holes, such as bottom ended holes, such as bottom ended drilled holes. The first joinery element recess may be a hole, such as a bottom ended hole, such as a bottom ended drilled hole. The locking recess may be a hole, such as a bottom ended hole, such as a bottom ended drilled hole. At least one of the at least two insertion recesses, the first joinery element recess and the locking recess may be a hole, such as a bottom ended hole, such as a bottom ended drilled hole.

The joinery product may further comprise one or more additional dowels protruding at a first angle (a1) from the first attaching surface and one or more two additional insertion recesses extending into the second attaching surface at a second angle (a2) from the second attaching surface and being configured to receive said one or more additional dowels.

The joinery product may further comprise one or more additional compressible locking elements positioned partially in an additional first joinery element recess, and one or more additional locking recesses at the second attaching surface being configured to receive said additional compressible locking element.

The compressible locking element may comprise a spring and a locking pin. Typically, one end of the compressible locking element comprises the locking pin.

The locking pin may comprise an end part having a tapered shape, such as in the shape of a truncated cone.

The joinery product may comprise an unlocking surface provided with an unlocking hole which reaches the compressible locking element. The compressible locking element may be configured to cooperate with an unlocking device through said unlocking hole, such that the end part is displaced towards a bottom of said first joinery element recess.

The unlocking hole may be provided into any surface within 10 cm, such as within 8 cm, such as within 6 cm, such as within 5 cm, such as within 4 cm, such as within 3 cm, such as within 2 cm, such as within 1 cm from the compressible locking element. The unlocking hole may be provided in a surface selected from the group consisting of the first joinery element surface, an opposed surface to first joinery element surface, and the third joinery element surface. The unlocking hole may be provided such that it does not intersect any dowel, such as the at least two dowels.

The unlocking hole may reach the upper surface of the compressible locking element, the end (bottom end) of the spring, the lowest portion of the compressible locking element, or an inner sloping surface within a radial recess in the locking pin.

The locking pin may comprise a radial recess which optionally extends through the locking pin.

The opening of the radial recess may be larger on one side of the locking pin such that there is an inner sloping surface towards the other opening.

The spring may be a static load spring.

The spring may comprise a U-shaped portion and an adjacent U-shaped portion, wherein a leg of the U-shaped portion is connected to a leg of the adjacent U-shaped portion.

The spring may be configured such that two adjacent U-shaped portions are closer to or contact each other in a compressed state compared to the non-compressed state.

The U-shaped portions may be circle segments extending over more than 180°.

The thickness of the U-shaped portions may be smaller in the legs of the U-shaped portions than the thickness of the U-shape portions closer to the bottom of the U-shape portions.

A shape along the spring may be such that a surface circumventing the outer parts the U-shaped portions is cylindrical.

A diameter of the cylindrical surface at non-compressed state may be greater than at maximum compression of the compressible locking element.

The end part may comprise a cut-out segment.

The spring may be a sequence of a first and a second elements, each element comprising a disc-shaped part and two, relative the center of the disc-shaped part, opposed bridging struts. The two opposed bridging struts may be arranged equally distanced from the center and on the same side of the disc-shaped part. The elements with said struts may be arranged with the disc-shaped parts parallel to one another. The first element with the struts directed towards the second element may be connected with said struts to the second element, with the struts of the second element pointing away from the first element. A line between the struts of the first element may be perpendicular to a line between the struts of the second element, when viewed axially.

The disc-shaped parts may be circular.

The disc-shaped parts may have centrally positioned, circular openings.

The disc-shaped parts may be made of a resilient material.

The spring may comprise at least 4 elements selected from the first and the second element.

An axial distance between two adjacent disc-shaped parts may be larger than an axial thickness of a single disc-shaped part.

Each dowel (31, 33) may comprise a lower side and an upper side, wherein the first angle (a1) may be between the lower side and the first attaching surface.

The joinery element recess may comprise an opposite side and a bottom surface, wherein the bottom surface extends between the side and the opposite side.

The compressible locking element may be configured to be compressed against a bottom surface of the joinery element recess during assembling of the first joinery element and the second joinery element.

According to a second aspect of the invention, there is provided a joinery product comprising a first joinery element having a first attaching surface and a second joinery element having a second attaching surface, wherein the first attaching surface faces and is configured to be locked with the second attaching surface. The joinery product further comprises a mechanical locking device comprising at least two dowels protruding at a first angle from the first attaching surface and at least two insertion recesses extending into the second attaching surface, said at least two insertion recesses being configured to receive said at least two dowels. The mechanical locking device further comprises a compressible locking element positioned partially in a first joinery element recess in the first attaching surface, wherein a side of the joinery element recess extends at a third angle (a3) relative the first attaching surface, and wherein the compressible locking element in the uncompressed state partially protrudes from first attaching surface. The mechanical locking device further comprises a locking recess at the second attaching surface being configured to receive said compressible locking element. A locking surface of said locking recess in the locked position is configured to cooperate with the compressible locking element for locking of the first joinery element relative to the second joinery element in directions in the plane of the first attaching surface. The inclination of said at least two dowels counteracts displacement of the first joinery element relative to the second joinery element along the normal direction of the first attaching surface. The compressible locking element is positioned between said at least two dowels in a direction perpendicular to the normal direction, wherein the first angle (a1) is in a range of 20-75 degrees, and wherein the third angle (a3) is in a range of 70-110°.

Embodiments of the first aspect of the invention are applicable to the second aspect of the invention.

According to a third aspect of the invention, there is disclosed a joinery product comprising:

- a first joinery element having a first edge surface, a second edge surface and a first joinery element surface, wherein said second edge surface is adjacent to said first edge surface and wherein a first attaching surface is at least part of said first edge surface or said second edge surface;
- a second joinery element having a second joinery element surface, a third joinery element surface, a third edge surface and a fourth edge surface, wherein a second attaching surface is at least part of said second joinery element surface, the third edge surface or the fourth edge surface, wherein the first attaching surface faces and is configured to be locked with the second attaching surface; and
- a mechanical locking device comprising:
- at least two dowels protruding at a first angle from the second attaching surface;
- at least two insertion recesses extending into the first attaching surface, said at least two insertion recesses being configured to receive said at least two dowels;
- a compressible locking element positioned partially in a first joinery element recess in the first attaching surface, wherein a side of the joinery element recess extends at a third angle relative the first attaching surface, and wherein the compressible locking element in the uncompressed state partially protrudes from first attaching surface; and a locking recess at the second attaching surface being configured to receive said compressible locking element. The locking surface of said locking recess in the locked position is configured to cooperate with the compressible locking element for locking of the first joinery element relative to the second joinery element in directions in the plane of the first attaching surface, wherein the inclination of said at least two dowels counteracts displacement of the first joinery element relative to the second joinery element along the normal direction of the first attaching surface. The compressible locking element is positioned between said at least two dowels in the locked position in a direction perpendicular to the normal direction, wherein the first angle is in a range of 20-75 degrees, and wherein the third angle is in a range of 70-110°. A difference between the first and the third aspect is that the dowels protrude from the second joinery element. Embodiments and examples of the third aspect are largely analogous to embodiments and examples of the first aspect, whereby reference is made thereto. For example, the following embodiments are conceivable.

The compressible locking element may be positioned less than 30 mm, such as less than 20 mm, such as less than 10 mm, such as less than 5 mm, from a straight line between said at least two dowels, in the locked position.

At least one of the at least two insertion recesses, the first joinery element recess and the locking recess may be a hole, such as a bottom ended hole, such as a bottom ended drilled hole.

The compressible locking element may comprise a spring and a locking pin. Typically, one end of the compressible locking element comprises the locking pin.

The locking pin may comprise an end part having a tapered shape, such as in the shape of a truncated cone.

The joinery product may comprise an unlocking surface provided with an unlocking hole which reaches the compressible locking element. The compressible locking element may be configured to cooperate with an unlocking device through said unlocking hole, such that the end part is displaced towards a bottom of said first joinery element recess.

The unlocking hole may be provided into any surface within 10 cm, such as within 8 cm, such as within 6 cm, such as within 5 cm, such as within 4 cm, such as within 3 cm, such as within 2 cm, such as within 1 cm from the compressible locking element. The unlocking hole may be provided in a surface selected from the group consisting of the first joinery element surface, an opposed surface to first joinery element surface, and the third joinery element surface. The unlocking hole may be provided such that it does not intersect any dowel, such as the at least two dowels.

The unlocking hole may reach the upper surface of the compressible locking element, the end (bottom end) of the spring, the lowest portion of the compressible locking element, or an inner sloping surface within a radial recess in the locking pin.

The locking pin may comprise a radial recess which optionally extends through the locking pin.

According to a fourth aspect of the invention, there is disclosed a piece of furniture comprising the joinery product according to the disclosure. The piece of furniture may be a bookshelf, a cupboard, a window frame, a door frame or the like.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION OF THE INVENTION

Figure 1:
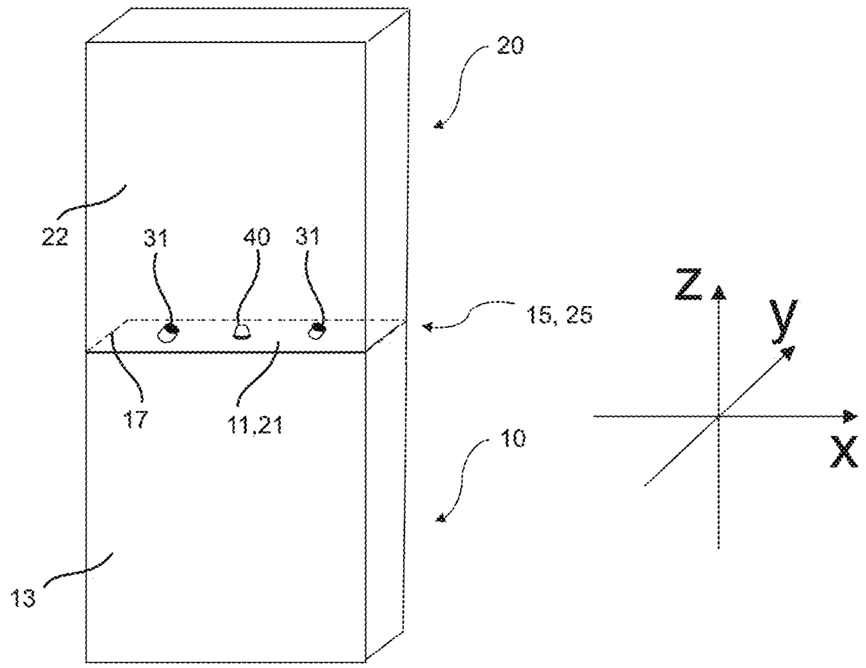
FIGS. 1-3 show schematic perspective views of different embodiments of the disclosure having different configurations of two joinery elements in locked position.

Specific embodiments of the invention now will be described with reference to the accompanying drawings. This invention may, however, be embodied in many different forms and should not be construed as limited to the embodiments of the joinery product put forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings and in the description, like numbers refer to like elements.

Embodiments of the joinery product, or parts thereof, according to the disclosure are shown in FIGS. 1-33.

Figure 2:
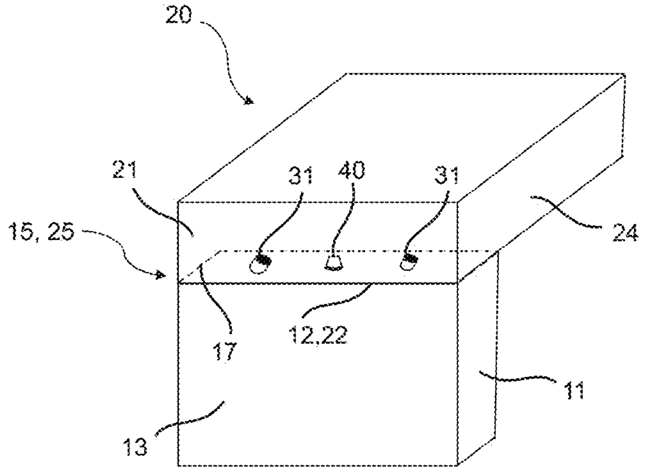
Figure 3:
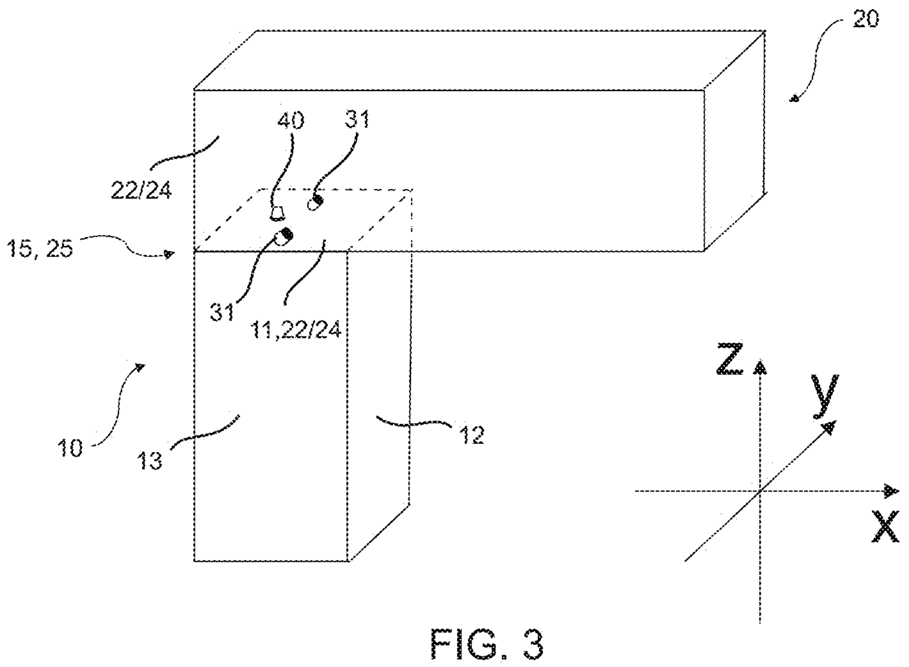

FIGS. 1 to 3 show schematic perspective views of the joinery product according to embodiments of the disclosure. In particular, different configurations of two joinery elements in locked position are shown. Thus, not all details and features are shown in FIGS. 1 to 3. Embodiments of configurations are shown in e.g., FIGS. 21*a*, 21*b*, 22, 22*b*, 23*a*, 23*b*.

The joinery product comprises a first joinery element 10 having a first edge surface 11, a second edge surface 12 and a first joinery element surface 13. The second edge surface 12 is adjacent to said first edge surface 11. A first attaching surface 15 is at least part of the first edge surface 11 (see FIGS. 1 and 3) or the second edge surface 12 (see e.g., FIGS. 2, 19 and 20).

As will be understood by a person skilled in the art, any surface, such as any planar surface, may constitute an attaching surface, although for shipping purposes, e.g., for enabling flat packs, the first attaching surface may be (or may be a part of) an edge surface.

The joinery product further comprises a second joinery element 20 having a second joinery element surface 22, a third joinery element surface 23, a third edge surface 21 and a fourth edge surface 24. A second attaching surface 25 is at least part of said second joinery element surface 22 (e.g., FIGS. 2, 3 and 19), the third edge surface 21 (FIG. 1) or the fourth edge surface 24 (see e.g., FIGS. 3 and 20). The first attaching surface 15 faces and is configured to be locked with the second attaching surface 25.

The cross section of the joinery elements may be squared, e.g., when the joinery element is a stud. Thus, the second joinery element surface 22 and the fourth edge surface 24 may be of similar width (e.g., FIG. 3).

The joinery product further comprises a mechanical locking device comprising at least two dowels 31 protruding from the first attaching surface 15 and a compressible locking element 40 partially protruding from the first attaching surface 15 in the uncompressed state, such as in the locked position.

The first joinery element 10 and/or the second joinery element 20 may be a wood based joinery element. The joinery elements according to the disclosure may have a cuboid shape, such as a cuboid shape with right angles. The joinery elements may have 1 to 4 mitred edges, or rabbet (e.g., FIGS. 21*a*-21*c*) or half lap joints. The cross sections of the joinery elements may be of any shape, such as a rectangular or quadratic shape, optionally with one or two decoratively milled surfaces. The joinery elements may be panels, boards or studs, optionally with 1 to 4 mitred edges, such as 1 or 2, or 1 to 4 rabbet or half lap joints, optionally with one or two decoratively milled surfaces.

Figure 32:
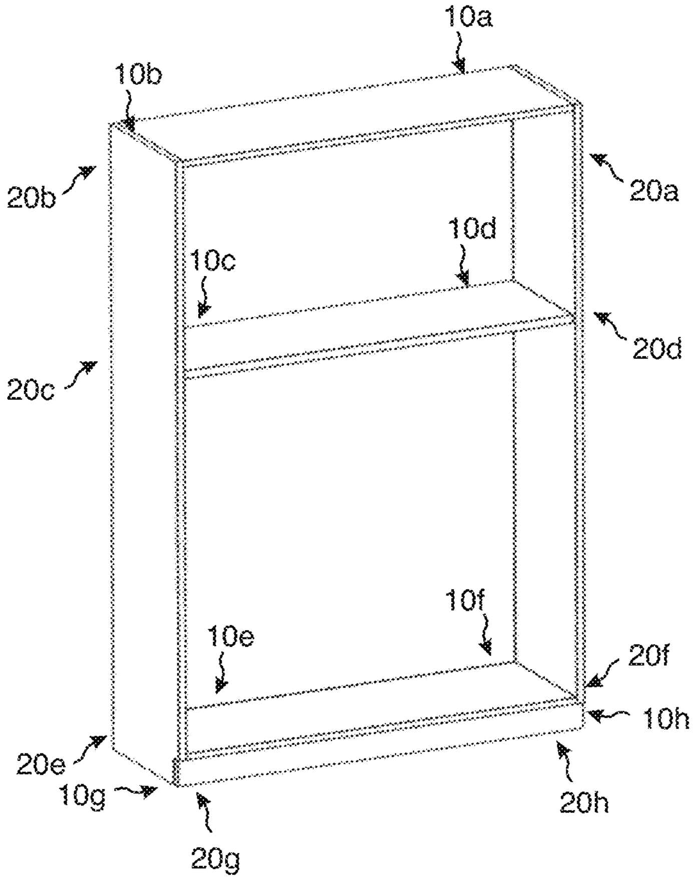
FIG. 32 shows a piece of furniture (a bookshelf) according to an embodiment of the joinery product according to the disclosure.
Figure 33:
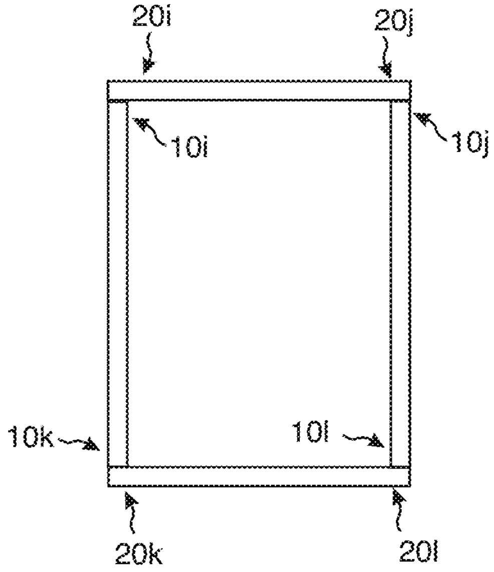
FIG. 33 shows a frame according to an embodiment of the joinery product according to the disclosure.

The first joinery element 10 and/or the second joinery element 20 may be a part of a furniture product or a frame. A furniture product may be as a bookshelf, a cupboard, a wardrobe, a box, a drawer, a kitchen cabinet, a countertop, or a tabletop. A frame may be a door frame or a window frame (see e.g., FIGS. 33, 21*a*, 21*b*, 22, 22*b*, 23*a* and 23*b*). One or more joinery elements in a product, may comprise more than one mechanical locking device and a product may comprise various examples joinery elements assembled with the mechanical locking device. A joinery element may further act as a first joinery element 10 when assembled to one joinery element, while acting as the second joinery element in a locked position with another joinery element. This is illustrated in FIGS. 32 and 33. For example, in FIG. 32 one panel acts as a first joinery element in 10*h*, while acting as a second joinery element in 20*a*, 20*d* and 20*f*.

The attaching surface may be planar.

The wood based joinery element may be a particle board, an HDF, a MDF or a plywood joinery element. Further details of the mechanical locking device are described below and are applicable to any configuration described in FIGS. 1 to 3.

Figure 4:
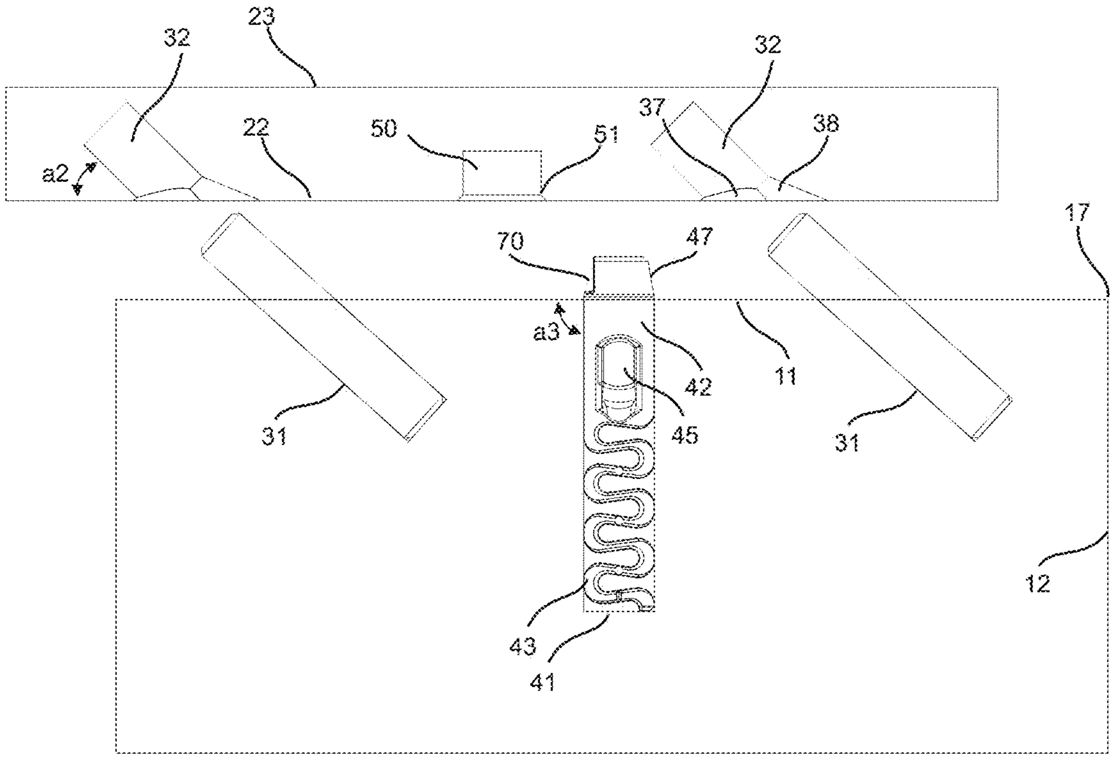
FIGS. 4-9 show in sequence (cross-sectional side views) the attaching of one joinery element to another joinery element with a mechanical locking device, according to an embodiment of the joinery product of the present disclosure.

FIGS. 4 to 10 show the process of connecting two joinery elements in a set according to one embodiment of the disclosure. Thus, the features numbered in FIG. 4 are also present in FIGS. 5 to 10, but they may be shown without numbering. The joinery product comprises a first joinery element 10 having a first edge surface 11, a second edge surface 12 and a first joinery element surface 13. The second edge surface 12 is adjacent to said first edge surface 11. The first attaching surface 15 may be the first edge surface 11.

The joinery product further comprises a second joinery element 20 having a second joinery element surface 22, a third joinery element surface 23, a third edge surface 21 and a fourth edge surface 24. The second attaching surface 25 may be the second joinery element surface 22. The first attaching surface 15 faces and is configured to be locked with the second attaching surface 25.

The joinery product further comprises a mechanical locking device comprising at least two dowels 31 protruding at a first angle a1 from the first attaching surface 15. The first angle a1 is in a range of 20-75 degrees, such as in a range of 30-60 degrees, such as in a range of 35-55 degrees, such as in a range of 40-50 degrees, such as about 45 degrees, as shown in FIGS. 4 to 9.

The mechanical locking device further comprises at least two insertion recesses 32 extending into the second attaching surface 25. The at least two insertion recesses 32 are configured to receive said at least two dowels 31. The at least two insertion recesses 32 extending into the second attaching surface 25 may have a countersink 37. The insertion recess 32 comprises an upper side 35 and an opposite lower side 36. The insertion recess 32 comprises the countersink 37 at the lower side 36, such as along 45 to 270°, such 90 to 180°, of the circumference of the at least two insertion recesses 32. This is particularly advantageous if the joinery element 20 with the insertion recess 32 has a harder outer layer as compared to the core of the panel. Making the countersink 37 corresponding to the thickness of the harder outer layer may prevent that the dowel affects the surface of the second joinery element 20.

The second joinery element 20 may comprise an insertions recess bevel 38 at an edge of an opening of the insertion recess 32, such as the upper side 36 of the insertion recess 32. The insertions recess bevel 38 is configured to make the edge of the opening blunt. A blunt edge may prevent that the edge cuts into the at least two dowels 31 when the at least two dowels are displaced into the insertion recesses 32.

The mechanical locking device further comprises a compressible locking element 40 positioned partially in a first joinery element recess 41 in the first attaching surface 15. The compressible locking element 40 partially protrudes from first attaching surface (15) in the uncompressed state. A side of the joinery element recess 41 extends at a third angle a3 relative the first attaching surface 15. The third angle a3 is in a range of 70-110 degrees, such as in a range of 75-105 degrees, such as in a range of 80-100 degrees, such as in a range of 85-95 degrees, such as about 90 degrees. In the uncompressed state, the compressible locking element 40 protrudes partially from first attaching surface 15.

The difference between the angle a1 and a3 may be 20-70 degrees, such as 30-60 degrees, such as 40-50 degrees, such as about 45 degrees.

The compressible locking element 40 may comprise a spring 43 and a locking pin 42. One end of the compressible locking element 40 may comprise the locking pin 42. The locking pin 42 may comprise an end part 47, said end part 47 having a tapered shape, such as in the shape of a truncated cone.

Figure 9:
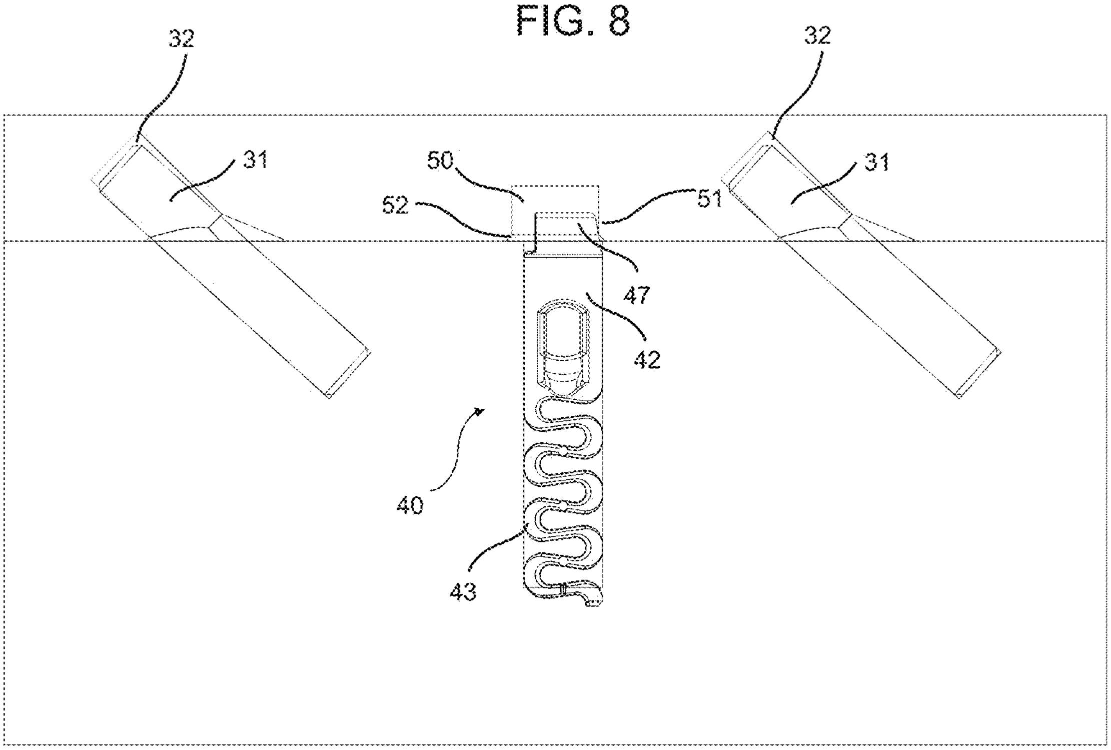

In FIG. 9, the advantage of the tapered shape at the end part 47 of the locking pin 42 is evident, i.e., as can be seen locking pin 42 and the locking recess 50 are not completely aligned. Even though, due to the tapered shape of the pin 42, the two joinery elements 10, 20 are locked to one another. To further facilitate the connection, the second locking recess 50 has a beveled opening edge 52 along its circumference.

The slant angle of the tapered shape, or the truncated cone is about 10 degrees in the shown embodiment. The slant angle of the truncated cone may be about 3 to 20 degrees, such as 5 to 15 degrees, such as 8 to 12 degrees. The centre axis of the locking pin 42 is perpendicular to the contact surface between the joinery elements 10, 20.

The mechanical locking device further comprises a locking recess 50 at the second attaching surface 25 being configured to receive said compressible locking element 40. A locking surface 51 of said locking recess 50 in the locked position is configured to cooperate with the compressible locking element 40 for locking of the first joinery element relative 10 to the second joinery element 20 in directions in the plane of the first attaching surface 15. The inclination of said at least two dowels 31 counteracts displacement of the first joinery element 10 relative to the second joinery element 20 along the normal direction of the first attaching surface 15.

The compressible locking element 40 is positioned between said at least two dowels in a direction perpendicular to the normal direction, such as in a direction along an axis y. The compressible locking element 40 may be positioned less than 30 mm, such as than 20 mm, such as less than 10 mm, such as less than 5 mm, from a straight line between said at least two dowels 31. As may be seen in FIGS. 1 and 2 the compressible locking element 40 may be in a straight line along the axis y with the at least two dowels 31, whereas in FIG. 3 the compressible locking element is only close to a straight line between the at least two dowels 31. Thus, the compressible locking element may or may not have the same position along an axis x, which is perpendicular to the axis y.

An advantage of positioning the compressible locking element between the at least two dowels, is that one of the at least two dowels may be placed closer to an edge of the first attaching surface. Each inclined dowel counteracts displacement of the first joinery element relative to the second joinery element along the normal direction of the first attaching surface i.e., each inclined dowel presses the joinery elements together. Thus, the positioning of a dowel close to an edge of the first attaching surface may prevent a gap from appearing. Such a gap could emerge as a consequence of an exterior force and/or by a force exerted by the compressible element.

The at least two insertion recesses 32 may extend into the second attaching surface 25 at a second angle a2 from the second attaching surface 25 and the difference between the first angle a1 and the second angle a2 may be in a range of 0 to 6 degrees, such as in a range of 1— 5 degrees, such as in a range of 2-4 degrees, such as about 3 degrees. The second angle a2 may be smaller than a1.

Figure 5:
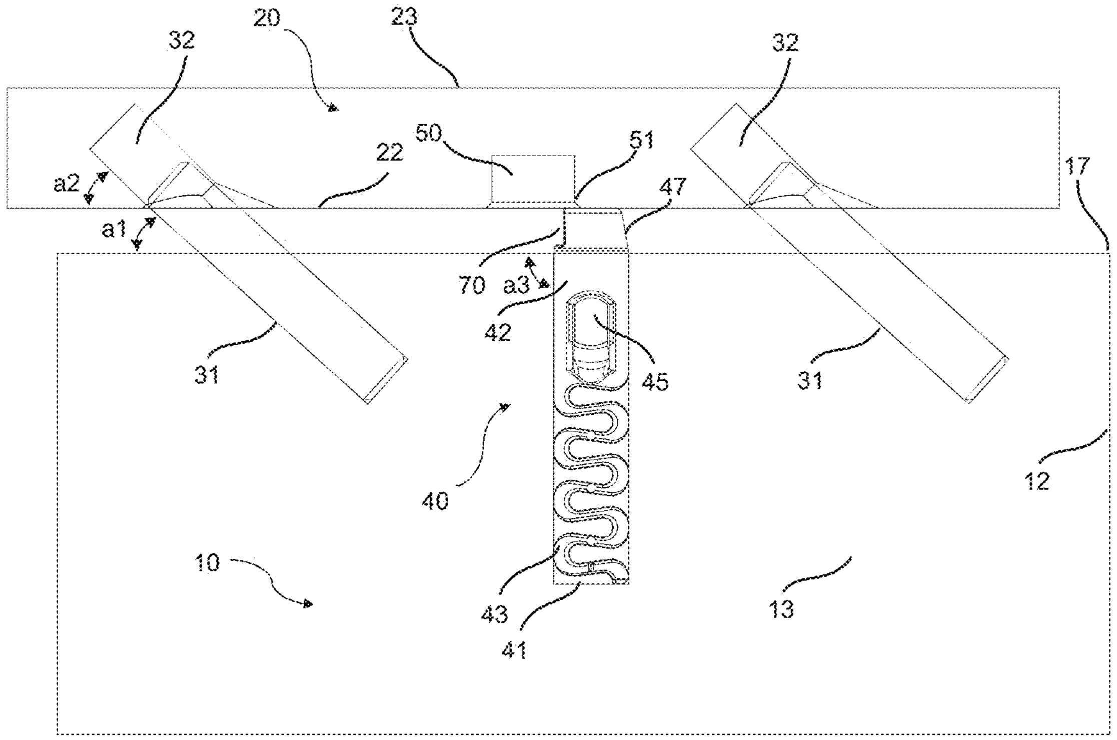
Figure 6:
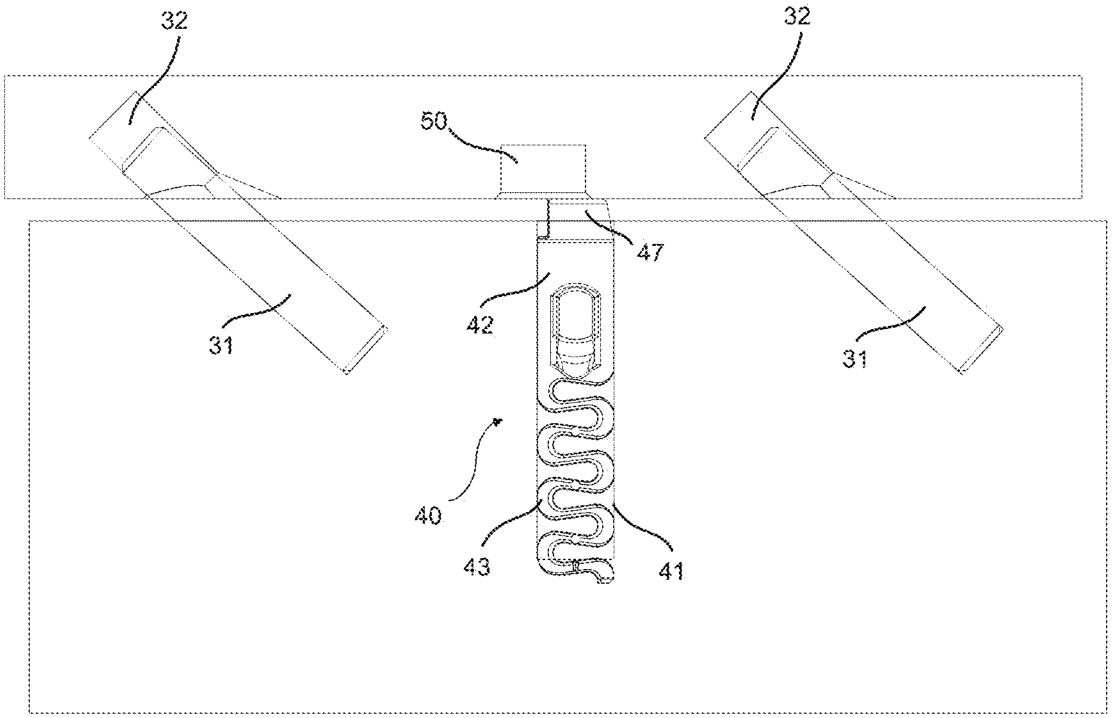
Figure 7:
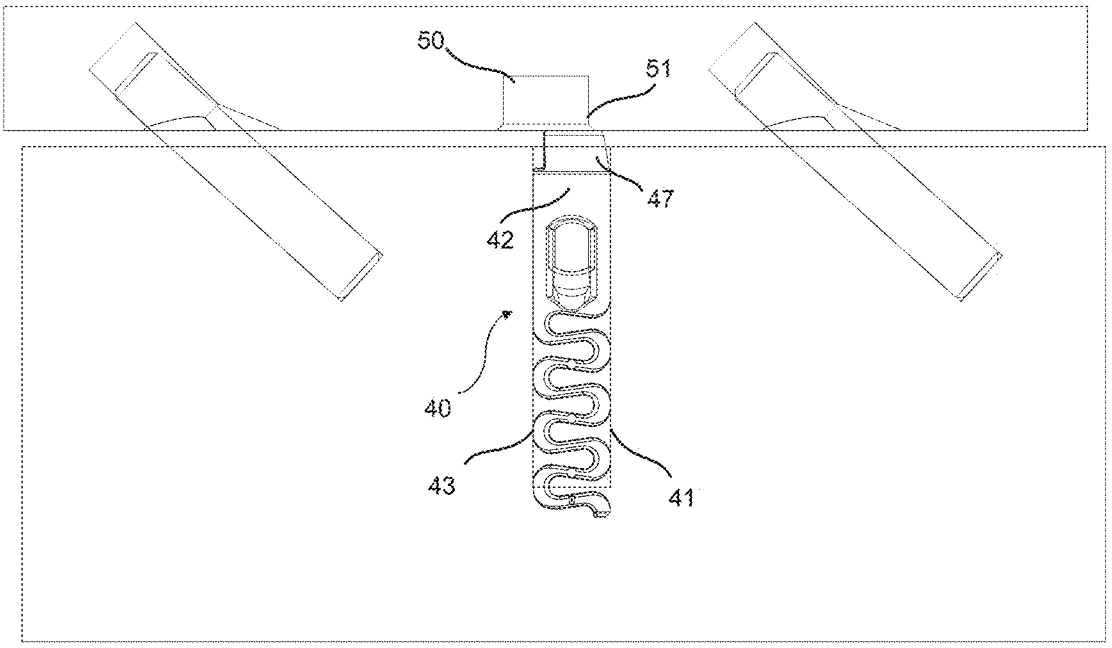

The sequence (FIGS. 4-9) illustrates how two dowels 31 may approach and enter the two insertion recesses 32 from FIG. 4 to FIG. 5. As the dowels enter the insertion recesses further (see FIGS. 6 to 8) compressible locking element 40 may be compressed and the end part 47 of the locking pin 42 may be pushed into the first joinery element recess. The compression may be achieved by a spring 42. Once the compressible locking element 40, such as the end part 47 of a locking pin 42 of the compressible locking element 40 meets the locking recess 50, the compressible locking element 40 may expand and enter the locking recess 50, see FIG. 9. The compressible locking element 40 may, in the locked position, be configured to be displaced partly into the locking recess 50.

Thus, FIG. 9 shows a locked position of the set according to one embodiment.

Figure 8:
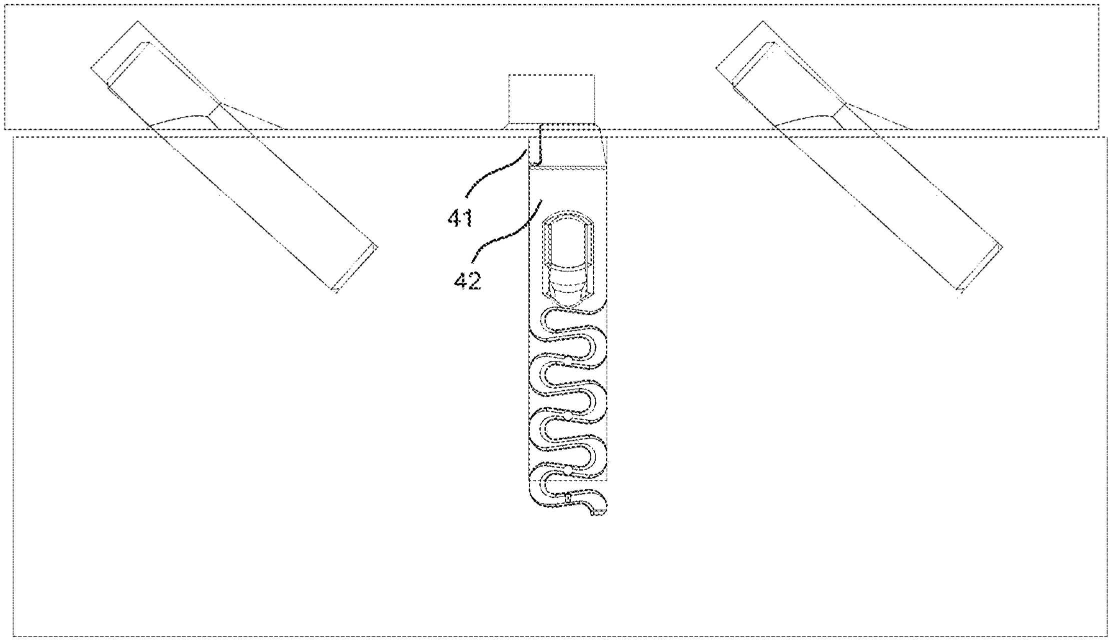

The compressible locking element 40, in a flexed/compressed state, is configured to be substantially positioned in the first joinery element recess 41 (see e.g., FIG. 8).

The first joinery element recess 41 and/or the locking recess 50 may be cylindrical holes, such as drill holes.

At least one of the at least two insertion recesses 32, the first joinery element recess 41 and the locking recess 50 may be a hole, such as a bottom ended hole, such as a bottom ended drilled hole. The insertion recesses 32 may be holes, such as bottom ended holes, such as bottom ended drilled holes. The first joinery element recess 41 may be a hole, such as a bottom ended hole, such as a bottom ended drilled hole. The locking recess 50 may be a hole, such as a bottom ended hole, such as a bottom ended drilled hole.

Any dowel herein may be positioned in holes in the first attaching surface 15. The holes may extend into the first attaching surface 15 at a first angle a1 from the first attaching surface 15.

With reference to FIGS. 10-16, The set according to embodiments of the disclosure may comprise an unlocking surface 16 provided with an unlocking hole 49 which reaches the compressible locking element 40. The compressible locking element 40 may be configured to cooperate with an unlocking device 48 through said unlocking hole 49, such that the end part 47 is displaced towards a bottom 44 of said first joinery element recess 41. The displacement of the end part 47 towards the bottom may achieve an unlocking.

The inner sloping surface 46, the end part 47 or the bottom 44 of the spring may be configured to cooperate with the unlocking device unlocking device 48 such that the end part 47 is displaced towards a bottom 44 of said first joinery element recess 41.

Figure 10:
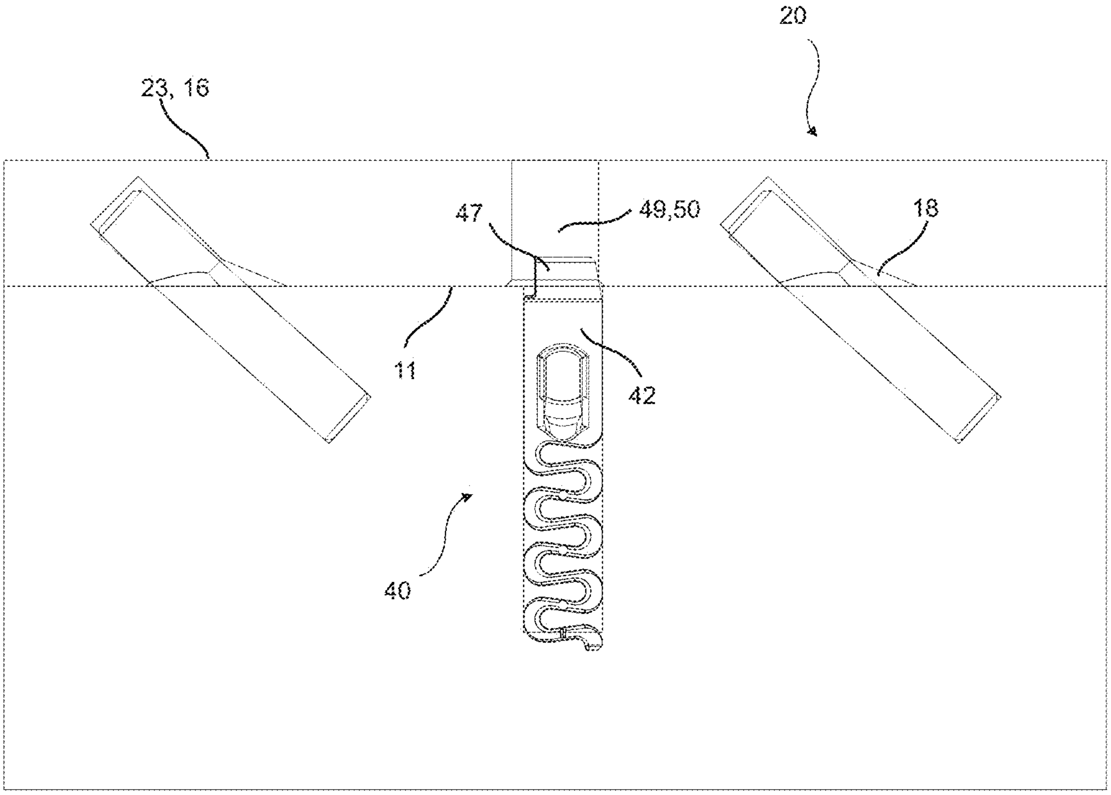
FIG. 10 is a cross-sectional side view of a joinery product having an unlocking hole according to an embodiment of the present disclosure.
Figure 11:
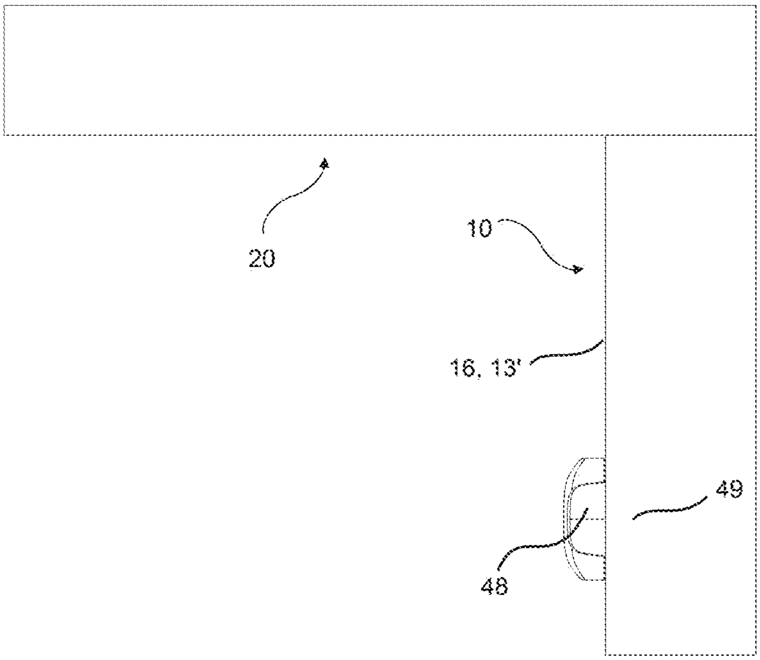
FIG. 11 is a side view showing an alternative placing of the unlocking hole, otherwise similar to the embodiment in FIGS. 12-14, FIGS. 12-14 are a sequence of cross-sectional side views of the unlocking of the first joinery element from the second joinery element of a joinery product having an unlocking hole according to an embodiment of the present disclosure.
Figure 12:
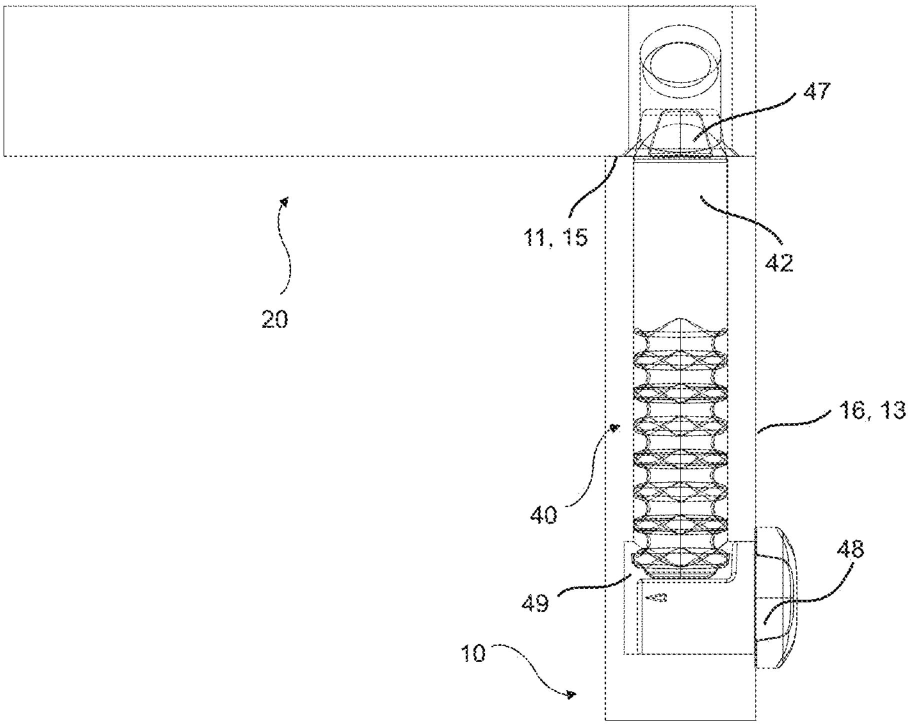

The unlocking hole 49 may be provided into any surface within 10 cm, such as within 8 cm, such as within 6 cm, such as within 5 cm, such as within 4 cm, such as within 3 cm, such as within 2 cm, such as within 1 cm from the compressible locking element 40. The unlocking hole 49 may be provided in a surface selected from the group consisting of the first joinery element surface 13, an opposed surface to first joinery element surface 13', the third joinery element surface 23, as shown in FIGS. 12, 11 and 10, respectively. The unlocking hole 49 may be provided such that it does not intersect any dowel, such as the at least two dowels 31.

The locking recess may be bottom-ended or open-ended.

With reference to FIG. 10, the unlocking hole may be provided in the third joinery element surface 23. The locking recess 50 may in such case be concentric with the unlocking hole 49, and/or coincide with the unlocking hole 49. The locking recess 50 may in such case be part of the unlocking hole 49. Thus, the locking recess 50 may be the unlocking hole 49.

FIGS. 11 and 12 show two similar embodiments, the difference being the position of the unlocking hole. The unlocking hole 49 may be provided in the first joinery element surface 13 or the opposed surface to first joinery element surface 13' depending on which positioning is more practical and/or less visible. Thus, the features in the embodiment in FIG. 12 may also be present and applicable in the embodiment in FIG. 11.

Figure 13:
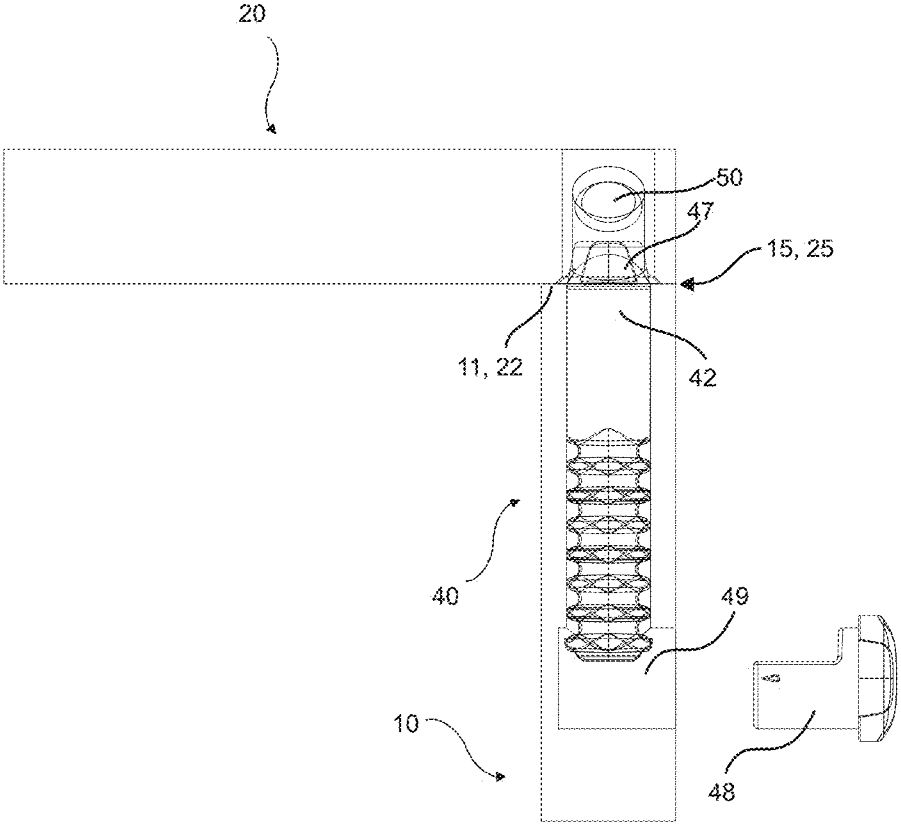
Figure 14:
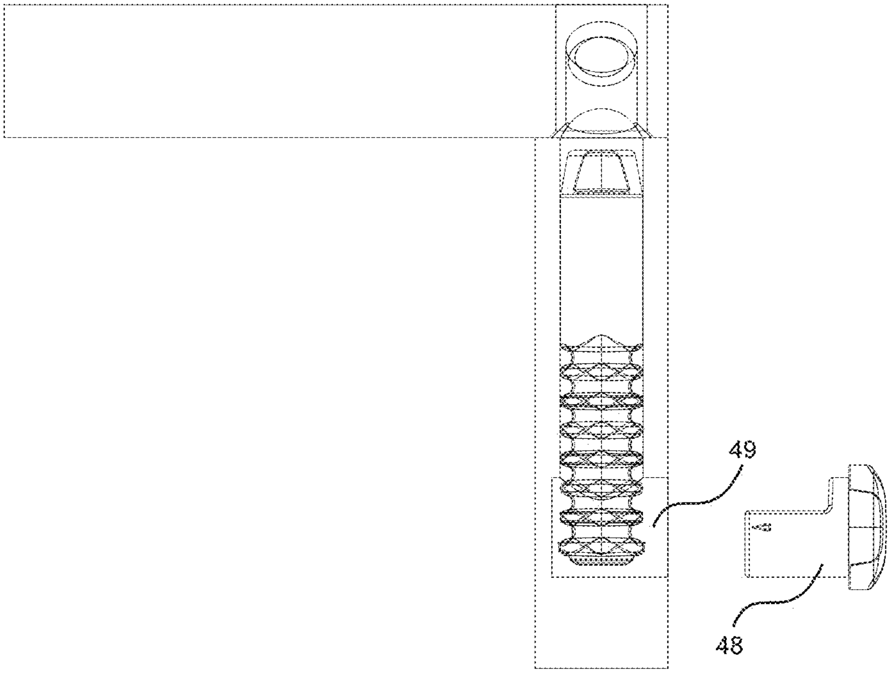

FIGS. 12-14 show a sequence of how an unlocking of the first joinery element 10 from the second joinery element 20 may be achieved. The unlocking hole may be provided close to the bottom 44 of the spring 43, such that the compressible locking element 40 may drop into the unlocking hole 49, in a lateral direction of the unlocking hole 49. According to this embodiment, in order to lock the first joinery element 10 to the second joinery element 20, an unlocking device 48 may be inserted into the unlocking hole such that the end part 47 compressible locking element 40 partially protrudes from the first attaching surface 15. In order to unlock the first joinery element 10 from the second joinery element 20, the unlocking device 48 may be removed from the unlocking hole such that the end part 47 compressible locking element 40 drops into the first joinery element recess 41, whereby the horizontal locking is released. The releasing of the horizontal locking may enable the removal of the at least two dowels from the at least two insertion recesses 32. The bottom 44 of the spring may be configured to cooperate with the unlocking device unlocking device 48 such that the end part 47 is displaced towards a bottom 44 of said first joinery element recess 41.

Figure 15:
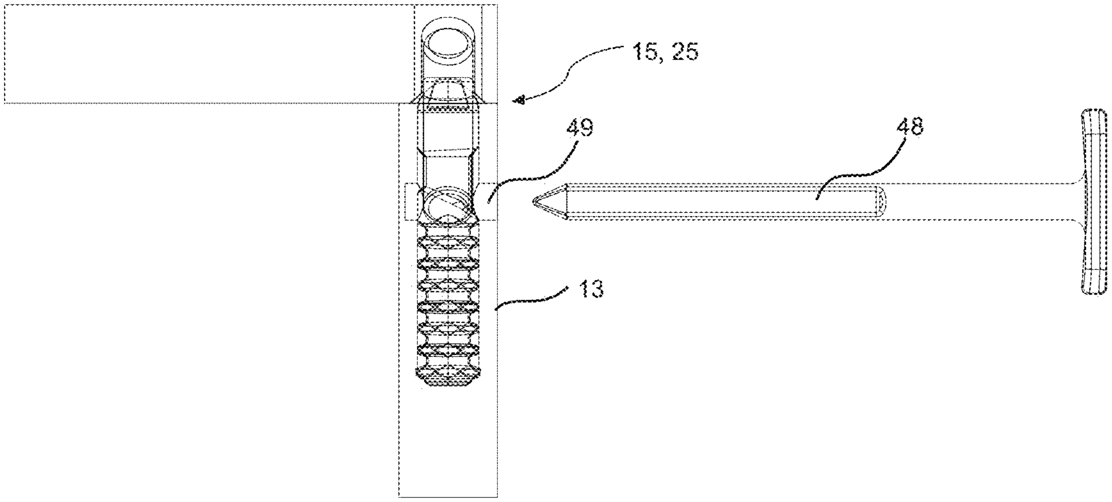
FIGS. 15-16 are a sequence of cross-sectional side views of the unlocking of the first joinery element from the second joinery element of a joinery product having an unlocking hole according to an embodiment of the present disclosure.
Figure 16:
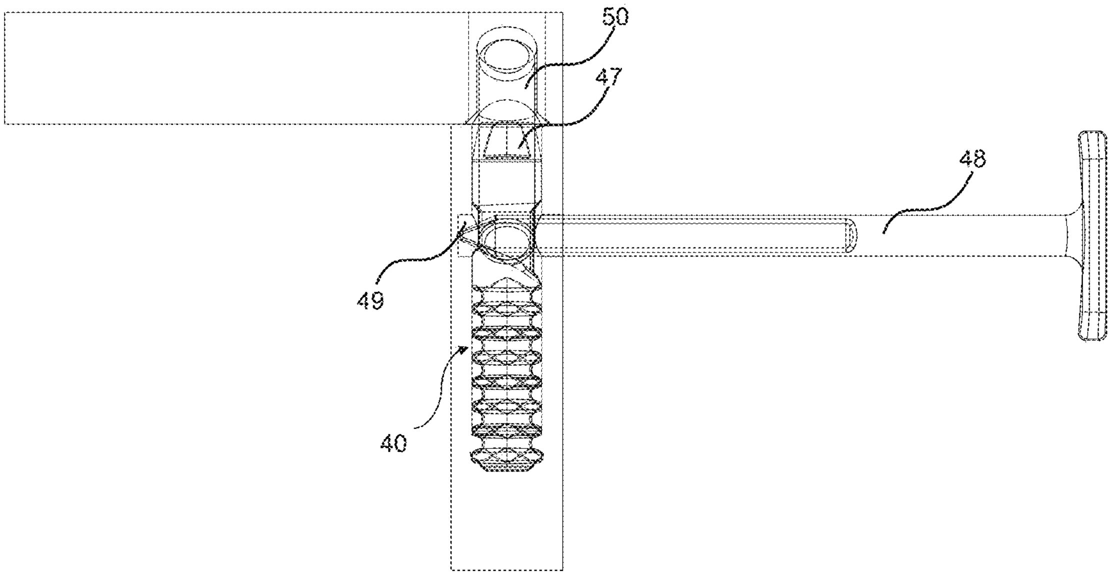

With reference to FIGS. 15 and 16, the inner sloping surface 46 may be configured to cooperate with the unlocking device unlocking device 48 such that the end part 47 is displaced towards a bottom 44 of said first joinery element recess 41. The unlocking hole may be provided in the in the first joinery element surface 13 or the opposed surface to first joinery element surface 13' depending on which positioning is more practical and/or less visible. The unlocking hole may be a bottom-ended hole or an open-ended hole going through the first joinery element (not shown). The unlocking hole may be open ended, such that the unlocking tool may be left inserted through the hole during unlocking. The compressible locking element 40, such as the inner sloping surface 46 may be configured to cooperate with the unlocking device, such that the end part 47 is displaced towards a bottom 44 of said first joinery element recess 41. By inserting the unlocking device 48 into the unlocking hole 49, the inner sloping surface may be reached, whereby the force created displaces the end part 47 towards a bottom 44 of said first joinery element recess 41. Thus, an unlocking may be achieved.

Figure 17:
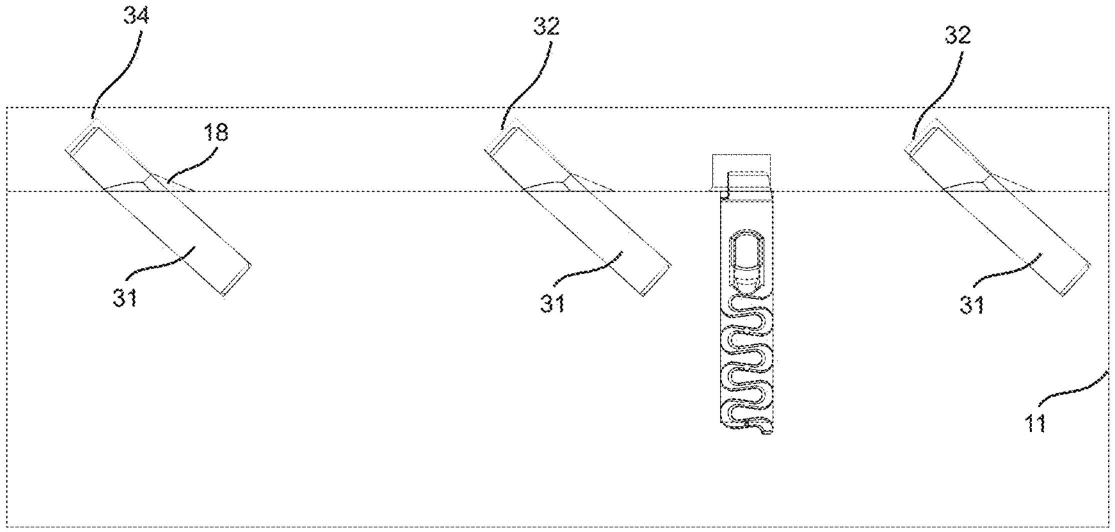
FIGS. 17-18 show an embodiment of a joinery product according to the disclosure, having an additional dowel, in locked and unlocked position.
Figure 18:
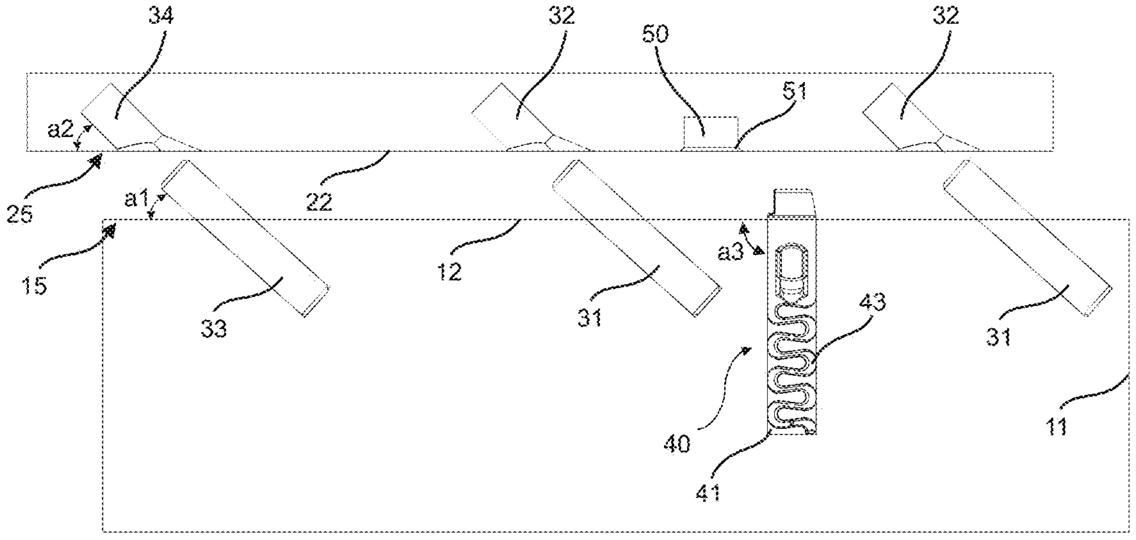
Figure 19:
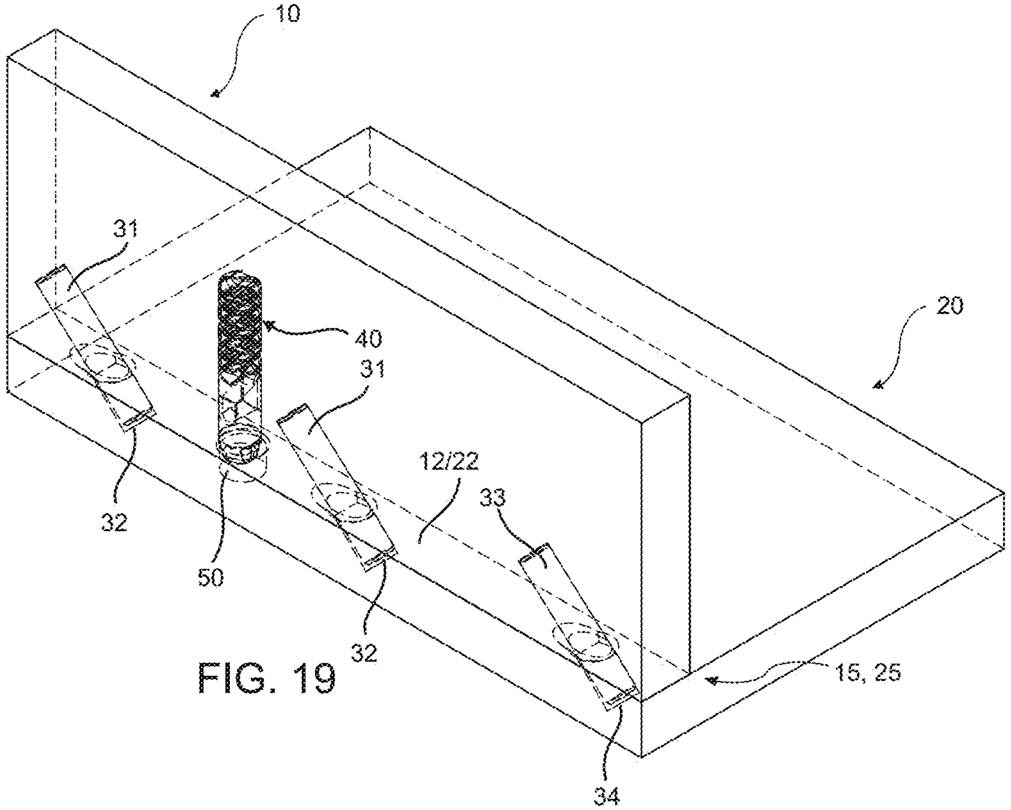
FIGS. 19-20 show exemplary embodiments of a joinery products according to the disclosure.

With reference to FIGS. 17 to 19, the set may further comprise one or more additional dowels 33 protruding at a first angle a1 from the first attaching surface. Additional dowels add strength to the locking in directions in the plane of the first attaching surface. The one or more additional dowels may be evenly distributed in the attaching surface, such as evenly distributed along the direction of a straight line between the at least two dowels 31. The number of additional dowels may also depend on the length of the first attaching surface 15. The set may further comprise 1 to 10, such as 1 to 5, such as 2 to 4 additional dowels 33.

The set may further comprise one or more additional insertion recesses 34 extending into the second attaching surface 25 at a second angle a2 from the second attaching surface 25 and being configured to receive said one or more additional dowels 33. The numbers of additional insertion recesses 34 typically correspond to the number of additional dowels 33.

Figure 20:
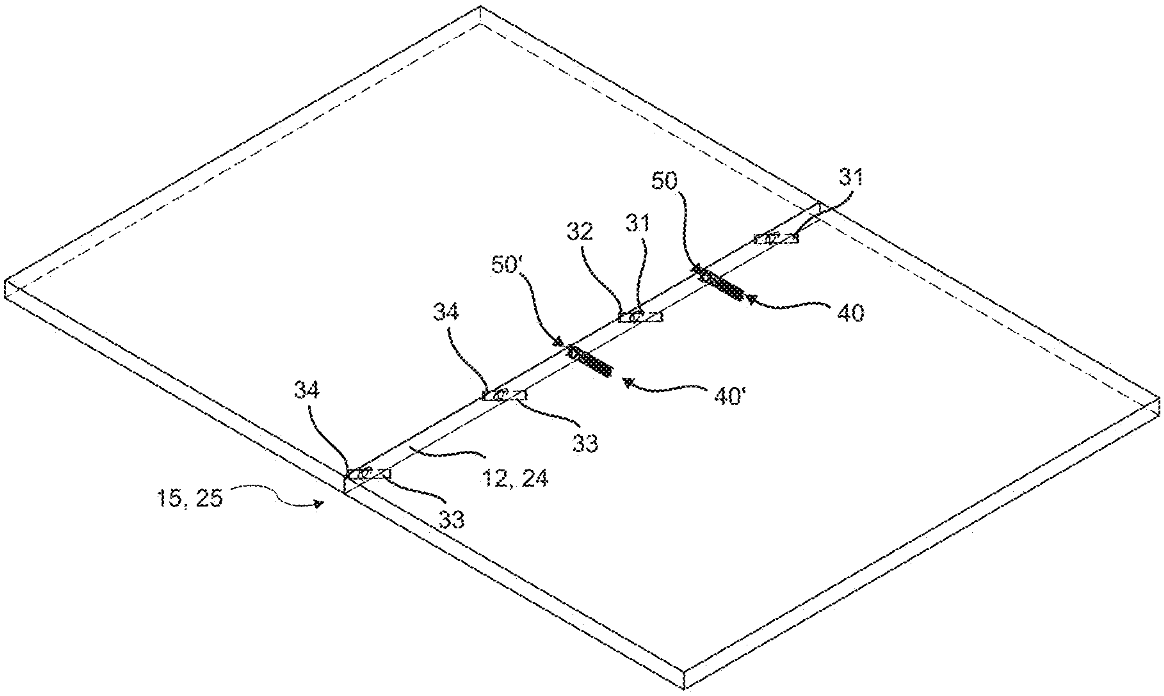

With reference to FIG. 20, the joinery product may further comprise one or more additional compressible locking elements 40' positioned partially in an additional first joinery element recess 41'. The set may comprise one or more additional locking recesses at the second attaching surface 25 being configured to receive said additional compressible locking element 40'.

Figure 21A:
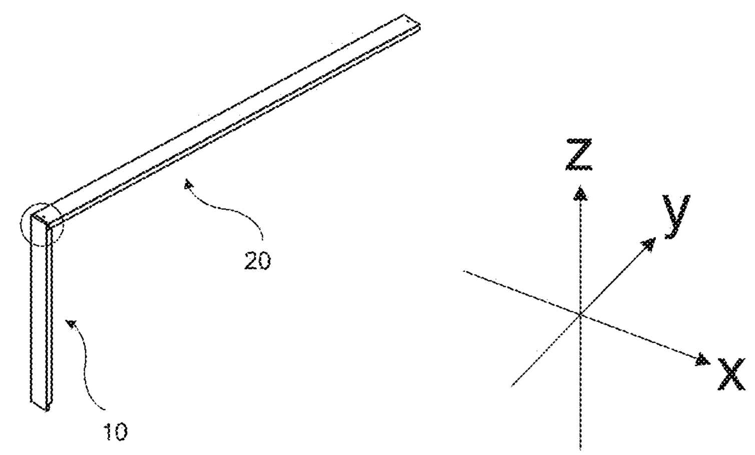
FIGS. 21*a*-21*b* show a cross-sectional amplification of an exemplary embodiment of a joint of a joinery product according to the disclosure.
Figure 21B:
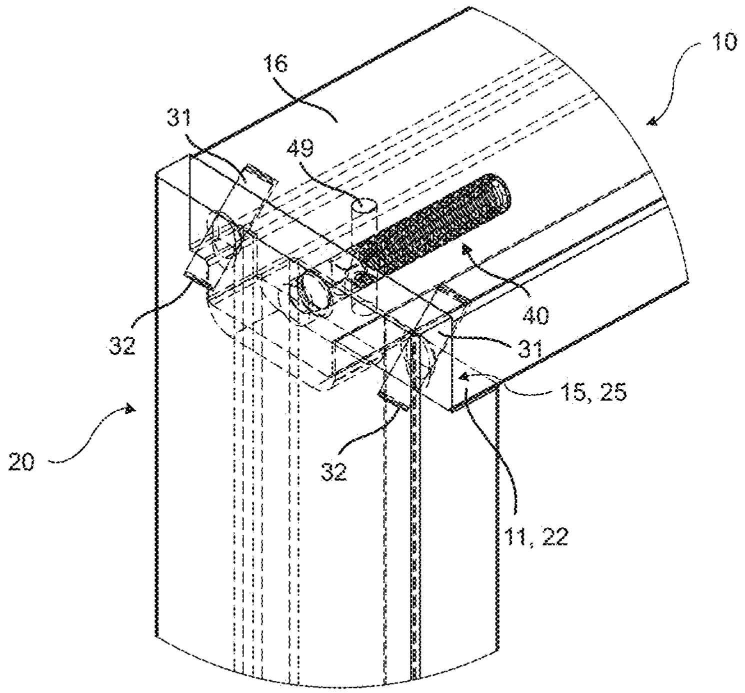

With reference to FIGS. 21*a*-21*b*, the joinery product may be a frame. The first joinery element 10 and the second joinery element 20 may be studs. The first joinery element 10 and the second joinery element 20 may have rabbet joints as shown in the figure. The at least two dowels may protrude from either the first joinery element 10 or the second joinery element 20. An exemplary embodiment of a frame is shown in FIG. 33. The compressible locking element 40 is positioned partially in a first joinery element recess 41 in the first attaching surface 15, wherein a side of the joinery element recess 41 extends at a third angle a3 relative the first attaching surface 15, and wherein the compressible locking element 40 in the uncompressed state partially protrudes from first attaching surface 15 and a locking recess 50 at the second attaching surface 25 being configured to receive the compressible locking element 40. An unlocking surface 16 is provided with an unlocking hole 49 which reaches the compressible locking element 40. The unlocking hole 49 may be straight into the unlocking surface 16 until it reaches the compressible locking element 40.

Figure 22:
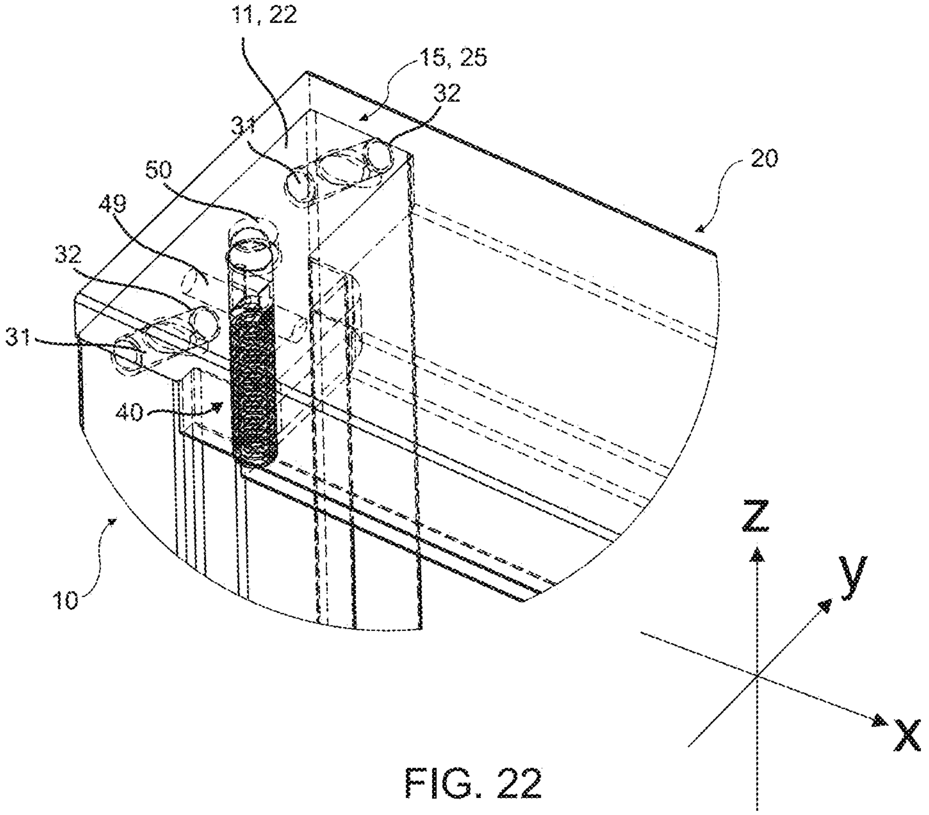
FIG. 22 shows a cross-sectional amplification of an exemplary embodiment of a joint of a joinery product according to the disclosure, FIG. 22*b* show a perspective view of the embodiment of FIG. 22, but not assembled.

With reference to FIG. 22, the joinery element 10 and the second joinery element 20 may have cross sections that are not squared. The compressible locking element 40 may be between the at least two dowels 31 in a direction along an axis y. The axis y may be parallel to the longest side of the cross section of the joinery element 10. The inclination direction of the at least two dowels may be along the axis x, which is perpendicular to the axis y.

Figure 22B:
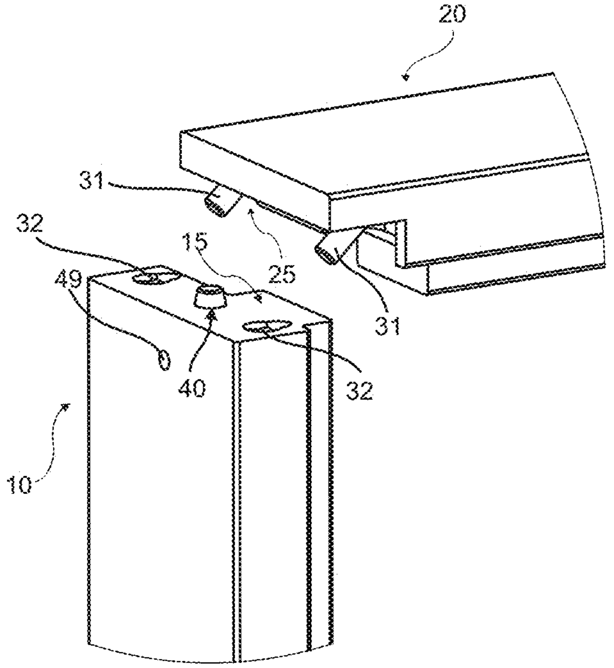

With reference to FIG. 22*b*, the figure highlights that the at least two dowels may protrude from the second joinery element 20 instead of from the first 10, while the compressible locking element is still in the first joinery element 10. However, the embodiment shown in FIGS. 22 and 22*b* may instead have the at least two dowels 31 protruding at a first angle a1 from the first attaching surface 15 and the at least two insertion recesses 32 extending into the second attaching surface 25 according to the first aspect. The at least two insertion recesses 32 are configured to receive the at least two dowels 31 according to the first aspect of the invention.

Figure 23A:
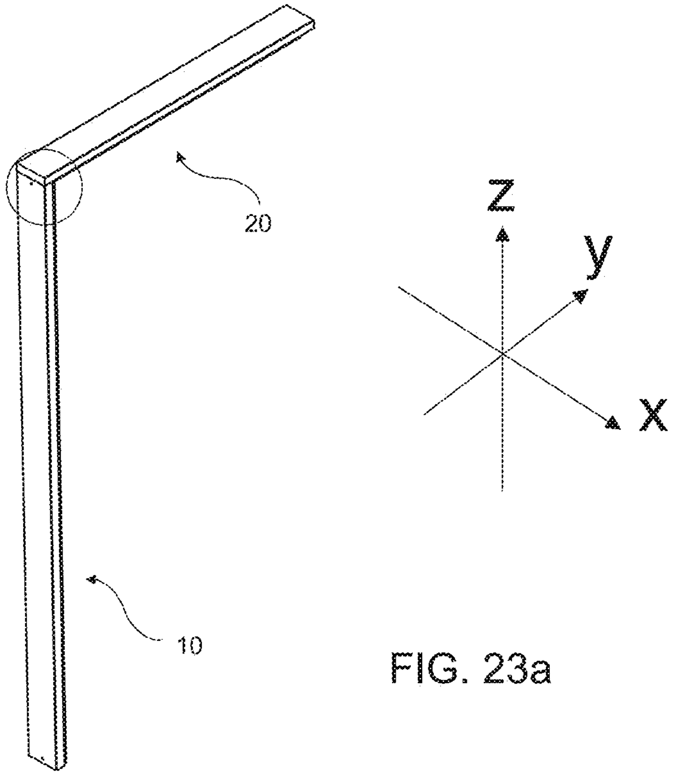
FIGS. 23*a*-23*b* show a cross-sectional amplification of an exemplary embodiment of a joint of a joinery product according to the disclosure.
Figure 23B:
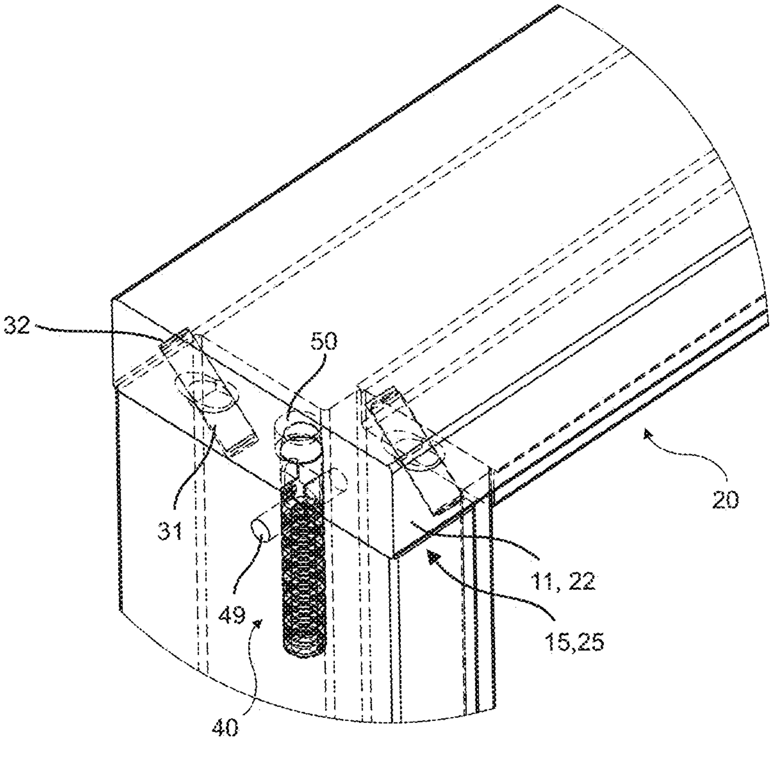

With reference to FIGS. 23*a*-23*b*, the joinery product may be a frame. The first joinery element 10 and the second joinery element 20 may be studs. The joinery element 10 and the second joinery element 20 may have cross sections that are not squared. The compressible locking element 40 may be between the at least two dowels 31 in a direction along an axis y. The direction of the straight line between the at least two dowels may deviate from the direction of the axis y. The inclination direction of the at least two dowels may be along the axis y or along the straight line between the at least two dowels.

Figure 24:
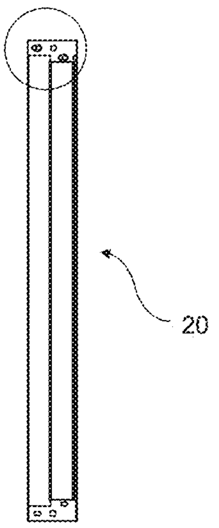
FIG. 24 shows a cross-sectional amplification of a second joinery element according to an exemplary embodiment of a joinery product according to the disclosure.
Figure 24:
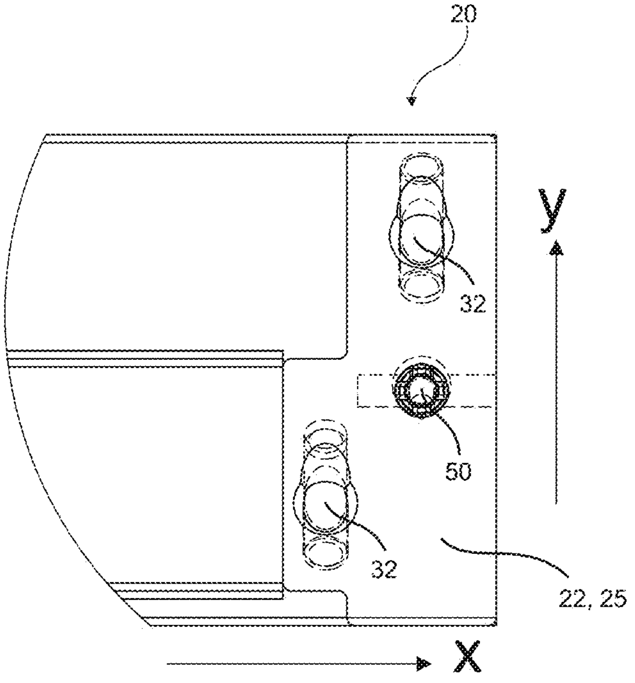

With reference to FIGS. 24, showing the same embodiment as in FIGS. 23 and 23*b*, but is a view of the joinery element 20 and an amplification of the same, where it is accentuated that the at least two dowels and the compressible locking element need not be in a straight line. The compressible locking element 40 may be between the at least two dowels 31 in a direction along an axis y. The direction of the straight line between the at least two dowels may deviate from the direction of the axis y. The inclination direction of the at least two dowels may be along the axis y.

Figure 27:
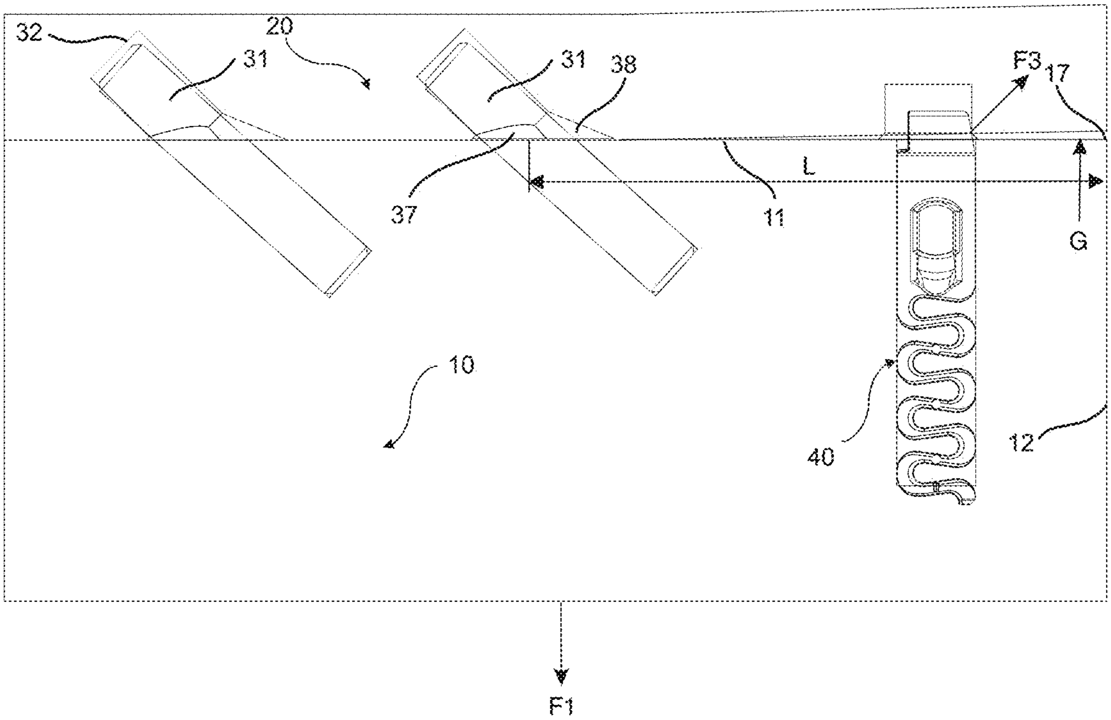
FIGS. 27-28 shows illustrations of the setups for Example 1 and Comparative example 1.
Figure 28:
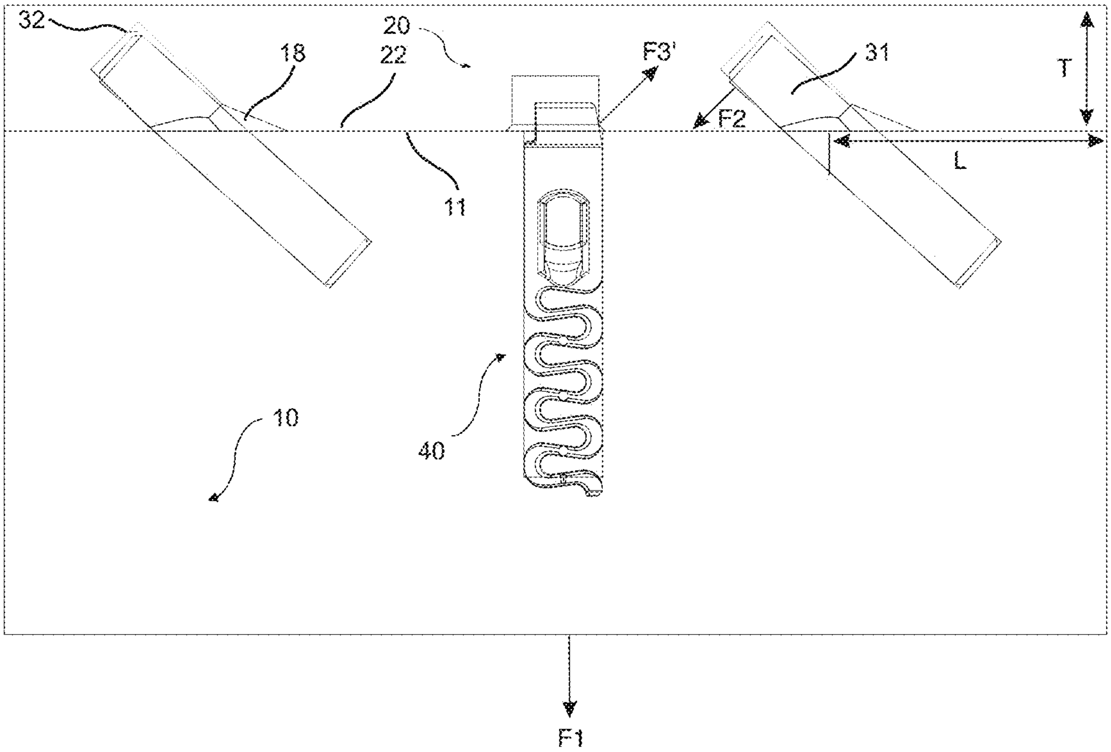

With reference to FIGS. 27 and 28, the figures show a comparison of a joinery product, where the compressible locking element 40 is positioned closer to the edge than the one of the at least two inclined dowels 31 which is inclined away from the side edge 17 (System 1) and a joinery product where the compressible locking element 40 is positioned the inclined dowels 31. As determined in Example 1 and Comparative Example 1, System 2 has a stronger locking than System 1. In particular, the extension in System 2 is smaller than that of System 1 at the same applied force.

The at least two dowels are inclined away from an edge of the first attaching surface 11, such the side edge 17, meaning the edge of the first attaching surface which is adjacent a second edge surface 12. The one of the at least two dowels that is positioned closest to the side edge 17, may be positioned at a distance L of less than 125 mm, such as less than 75 mm, such as less than 65, such as less than 50 mm from any edge of the first attaching surface 11, such as the side edge 17. With a larger thickness of the second joinery element the distance L may be longer. The ratio between the distance L, between the centre line of the dowel that is inclined away from the side edge and the side edge, and the thickness T of the second joinery element 20 and may be less than 5, such as less than 4, such as less than 3, such as less than 2, such as less than 1. The ratio between the distance L, between the centre line of the dowel that is inclined away from the side edge and the side edge, and the thickness T of the second joinery element 20 and may be 1 to 5, such as 1 to 4, such as 1 to 3.

Figures 25A, 25B, 25C:
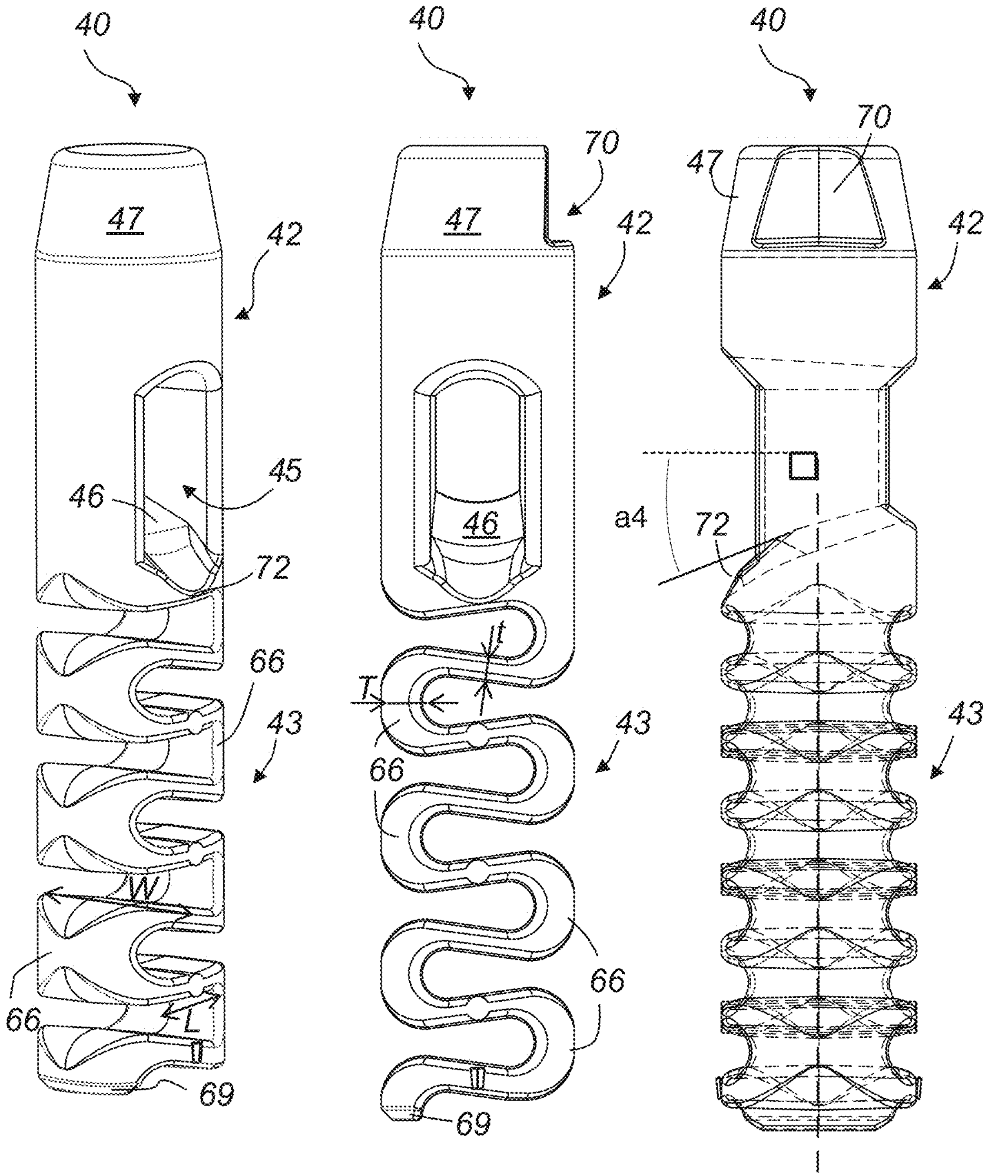
FIGS. 25*a*-25*c* are various views of a compressible locking element according to an embodiment of the joinery product of the present disclosure.
Figure 26:
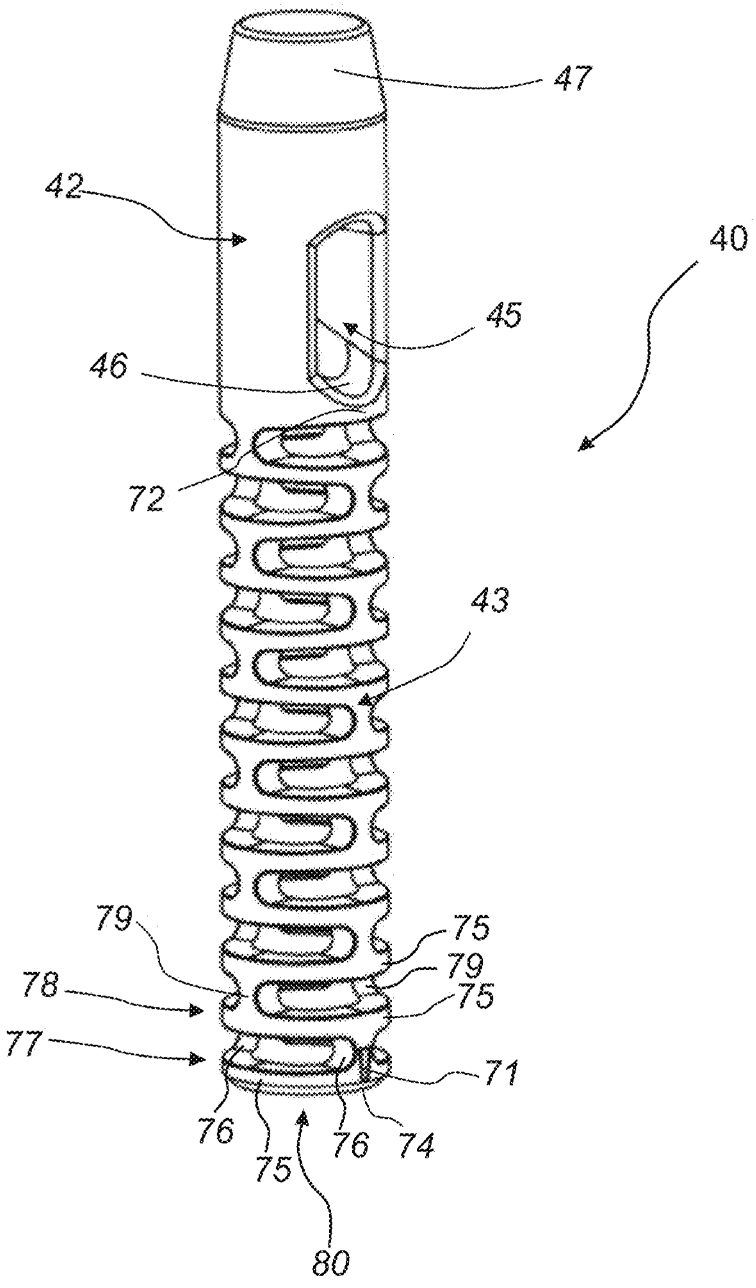
FIG. 26 is a side view of a compressible locking element according to an embodiment of the joinery product of the present disclosure.

With reference to FIGS. 25*a*-25*c*, a compressible locking element 40 is shown which comprises a spring 43 and a locking pin 42. The compressible locking element 40 can be used for locking two elements to one another. One end of the compressible locking element 40 may comprise the locking pin 42.

The spring 43 may the spring 39 comprises a U-shaped portion 66 and an adjacent U-shaped portion 66, wherein a leg of the U-shaped portion is connected to a leg of the adjacent U-shaped portion.

The spring 43 may comprise two or more U-shaped portions 66.

An advantage with this embodiment of the spring 43 may be that an outer diameter of the spring does not increase, or that an increase of the outer diameter is insignificant, such as less than 0.3 mm, when the spring 43 is compressed. This may have the effect that the spring 43 when inserted in e.g., a hole or recess 41 is not pinched in the hole/recess when the spring is compressed.

The compressible locking element 40 may comprise a polymer material, such as a thermoplastic material, optionally with an enforcement, such as glass fibre.

The spring 43 and the locking pin 42 may be injection moulded in one piece.

Also, the U-shaped portions 6 may be circle segments extending over more than 180°.

One end of the spring 43 ends in the U-shaped portion such that the end 69 points in a direction away from the spring 43.

The shape along the spring is such that a surface circumventing the outer parts of the U-shaped portions 66 is cylindrical. The diameter of the cylindrical surface at non-compressed state is greater than at maximum compression of the spring 43.

The spring 43 may be a static load compressible spring.

Further, one end of the compressible locking element 40 comprises the locking pin 42. The locking pin 42 may comprise an end part 47 having a tapered shape, such as in the shape of a truncated cone.

The locking pin 42 may comprise a radial recess 45 which may optionally extend through the locking pin 42. The opening of the radial recess 45 is larger on one side of the locking pin 42 such that there is inner sloping surface 46 towards the other opening.

For facilitating the placement of the spring-loaded pin, i.e., to be able to more easily check if the pin is positioned correctly, the end part 47 of the locking pin 42 has a cut-out segment 15. Also, the centre portion of the connecting element 5 farthest from the locking pin 42, has two opposed radially projecting parts 14 on its outermost surface. When the spring-loaded locking pin is inserted in a hole/recess in a joinery element, the locking pin with these projecting parts 14 exhibit a rotational resistance.

The lateral surface of the locking pin has a radially extending recess 45, the recess 11 having an inner sloping surface 46 axially towards the locking pin and starting at an axial point 72 at the side of the recess opening closest to the end with the spring of the locking pin. The sloping surface angle a4 is about 30 degrees seen from the side of the spring-loaded locking pin.

The lateral surface of the locking pin has a radially extending recess 45, the recess having an inner sloping surface 46 axially towards the locking pin 42 and starting at an axial point 72 at the side of the recess opening closest to the end with the spring 43 of the locking pin.

The recess 45 in the locking pin is a through hole such that there is a recess opening and a recess exit.

The spring 43 may be configured such that two adjacent U-shaped portions 66 are closer to or contact each other in a compressed state compared to the non-compressed state.

The U-shaped portions 66 may be circle segments extending over more than 180°.

The thickness (t) of the U-shaped portions may be smaller in the legs of the U-shaped portions than the thickness (T) of the U-shape portions 66 closer to the bottom of the U-shape portions 66.

A shape along the spring may be such that a surface circumventing the outer parts the U-shaped portions 66 is cylindrical.

A diameter of the cylindrical surface at non-compressed state may be greater than at maximum compression of the compressible locking element 40.

The end part 47 may comprise a cut-out segment 70.

The spring 43 may be a sequence of a first and a second elements 77, 78, each element comprising a disc-shaped part 75 and two, relative the centre of the disc-shaped part 75, opposed bridging struts 76, 79. The two opposed bridging struts 76, 79 may be arranged equally distanced from the centre and on the same side of the disc-shaped part 75. The elements 77, 78 with said struts 76, 79 may be arranged with the disc-shaped parts 75 parallel to one another. The first element 77 with the struts 76 directed towards the second element 78 may be connected with said struts 76 to the second element 78, with the struts 79 of the second element 78 pointing away from the first element 77. A line between the struts 76 of the first element 77 may be perpendicular to a line between the struts 79 of the second element 78, when viewed axially.

The disc-shaped parts 75 may be circular.

The disc-shaped parts 75 may have centrally positioned, circular openings 80.

The disc-shaped parts 75 me be made of a resilient material.

The spring may comprise at least 4 elements selected from the first and the second element 77, 78.

An axial distance 81 between two adjacent disc-shaped parts 75 may be larger than an axial thickness 82 of a single disc-shaped part 75.

With reference to FIG. 22*b*, the figure highlights that the at least two dowels may protrude from the second joinery element 20 instead of from the first 10, while the compressible locking element is still in the first joinery element 10. Thus, according to a third aspect of the invention, there is disclosed a joinery product comprising a first joinery element 10 having a first edge surface 11, a second edge surface 12 and a first joinery element surface (13), wherein said second edge surface (12) is adjacent to said first edge surface (11) and wherein a first attaching surface (15) is at least part of said first edge surface (11) or said second edge surface (12). The joinery product comprises a second joinery element (20) having a second joinery element surface (22), a third joinery element surface (23), a third edge surface (21) and a fourth edge surface (24), wherein a second attaching surface (25) is at least part of said second joinery element surface (22), the third edge surface (21) or the fourth edge surface (24), wherein the first attaching surface (15) faces and is configured to be locked with the second attaching surface (25). The joinery product further comprises a mechanical locking device comprising: at least two dowels (31) protruding at a first angle (a1) from the second attaching surface (25); at least two insertion recesses (32) extending into the first attaching surface (15), said at least two insertion recesses (32) being configured to receive said at least two dowels (31); a compressible locking element (40) positioned partially in a first joinery element recess (41) in the first attaching surface (15). A side of the joinery element recess (41) extends at a third angle (a3) relative the first attaching surface (15), and the compressible locking element (40) in the uncompressed state partially protrudes from first attaching surface (15). The mechanical locking device further comprises a locking recess (50) at the second attaching surface (25) being configured to receive said compressible locking element (40). A locking surface (51) of said locking recess (50) in the locked position is configured to cooperate with the compressible locking element (40) for locking of the first joinery element relative (10) to the second joinery element (20) in directions in the plane of the first attaching surface (15). The inclination of said at least two dowels (31) counteracts displacement of the first joinery element (10) relative to the second joinery element (20) along the normal direction of the first attaching surface (15). The compressible locking element (40) is positioned between said at least two dowels in the locked position in a direction perpendicular to the normal direction. The first angle (a1) is in a range of 20-75 degrees, and the third angle (a3) is in a range of 70-110°. A difference between the first and the third aspect is that the dowels protrude from the second joinery element. Thus, all features in the first aspect may be applicable to the third aspects.

The at least two insertion recesses (32) may extend into the first attaching surface (15) at a second angle (a2) from the first attaching surface (15) and the difference between the first angle (a1) and the second angle (a2) may be in a range of 0 to 6 degrees.

The compressible locking element (40) may be positioned less than 30 mm, such as less than 20 mm, such as less than 10 mm, such as less than 5 mm, from a straight line between said at least two dowels (31), in the locked position.

The compressible locking element (40) may, in a flexed/compressed state, be configured to be substantially positioned in the first joinery element recess (41).

The compressible locking element (40) may, in the locked position, be configured to be displaced partly into the locking recess (50).

At least one of the at least two insertion recesses (32), the first joinery element recess (41) and the locking recess (50) may be a hole, such as a bottom ended hole, such as a bottom ended drilled hole.

The joinery product may further comprise one or more additional dowels (33) protruding at a first angle (a1) from the second attaching surface (25); and one or more two additional insertion recesses (34) extending into the first attaching surface (15) at a second angle (a2) from the first attaching surface (15) and being configured to receive said one or more additional dowels (33).

The joinery product may further comprise one or more additional compressible locking elements (40') positioned partially in an additional first joinery element recess (41'), and one or more additional locking recesses (50') at the second attaching surface (25) being configured to receive said additional compressible locking element (40').

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used.

The indefinite articles "a" and "an," as used herein in the specification and in the claims, unless clearly indicated to the contrary, should be understood to mean "at least one".

Comparative Example 1

Two particle board panels with the dimension 210×60×16 mm and 210×74×16 mm and the density 600 kg/m3 were assembled such that a first edge surface 11 faces a second joinery element surface 22 according to the schematic setup of FIG. 27. The dowels were wooden dowels with a length of 40 mm and a diameter of 8 mm. The angle a1 was 42 degrees, a2 was 45 degrees and a3 was 90 degrees. The compressible locking elements were made of Hostaform 13031 (Polyoxymethylene with graphene nanoribbons).

In system 1, the compressible locking element was placed closer to the side edge 17, i.e., the edge between the first edge surface 11 and the second edge surface 12, than the dowels, 30 mm from the side edge. The distance L between the centre line of the dowel, that is inclined away from the side edge, and the side edge 17, was 70 mm.

The assembled particle board panels were fastened and a force F1 was applied on one of the panels pulling away from each other. The force was increased and the extension of the system in the direction of the force was measured. The experiment was performed five times with similar samples.

Example 1

Two particle board panels with the dimension 210×60×16 mm and 210×74×16 mm and the density 600 kg/m3 were assembled such that a first edge surface 11 faces a second joinery element surface 22 according to the schematic setup of FIG. 28. The dowels were wooden dowels with a length of 40 mm and a diameter of 8 mm. The angle a1 was 42 degrees, a2 was 45 degrees and a3 was 90 degrees. The compressible locking elements were made of Hostaform 13031 (Polyoxymethylene with graphene nanoribbons).

In system 2, the compressible locking element was placed between the dowels, 64 mm from the side edge 17. The distance L between the centre line of the dowel that is inclined away from the side edge 17, and the side edge, was 27 mm.

The assembled particle board panels were fastened and a force F1 was applied on one of the panels pulling away from each other. The force was increased and the extension of the system in the direction of the force was measured. The experiment was performed five times with similar samples.

Figure 29:
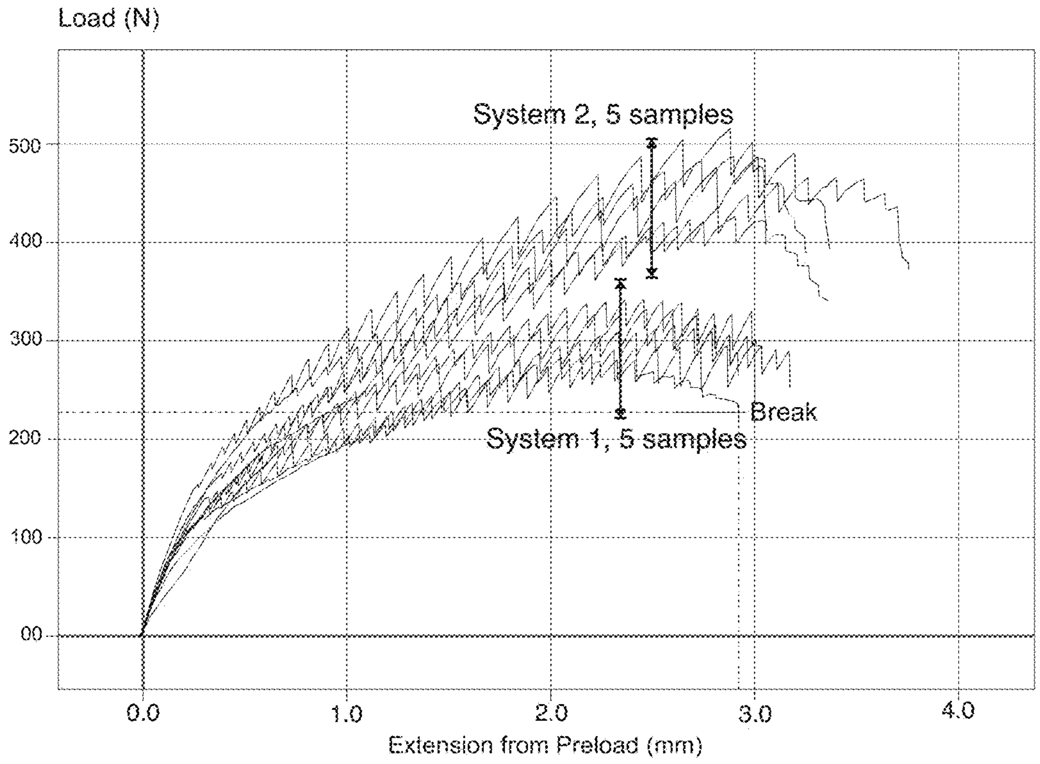
FIG. 29 is a diagram showing the Extension of samples of a joinery product assembled in two different ways (System 1 and 2) when being subjected to an increasing tensile stress.
Figure 30:
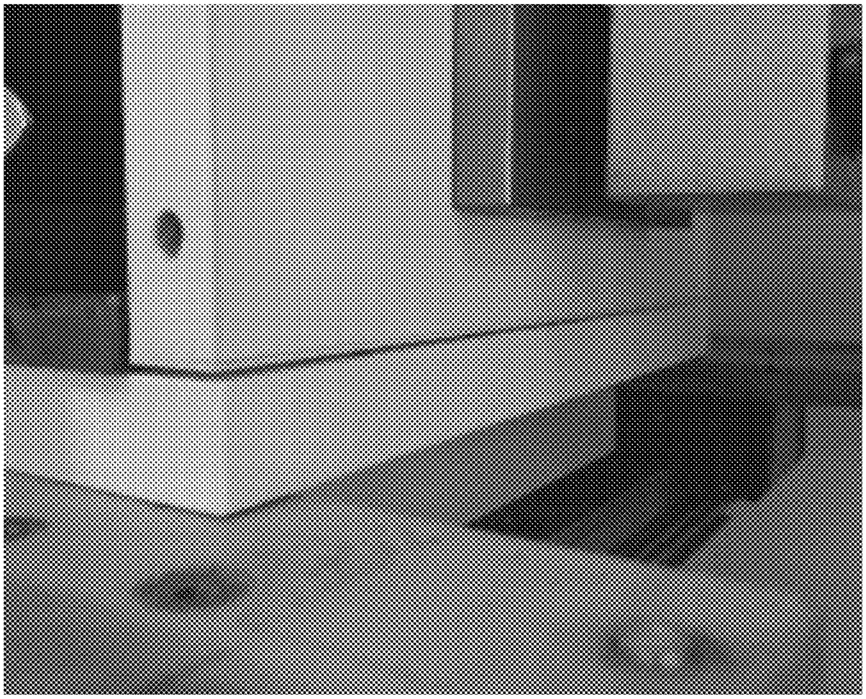
FIGS. 30-31 show screenshots from a video of Systems 1 (FIG. 30) and 2 (FIG. 31) when subjected to 200 N of force.
Figure 31:
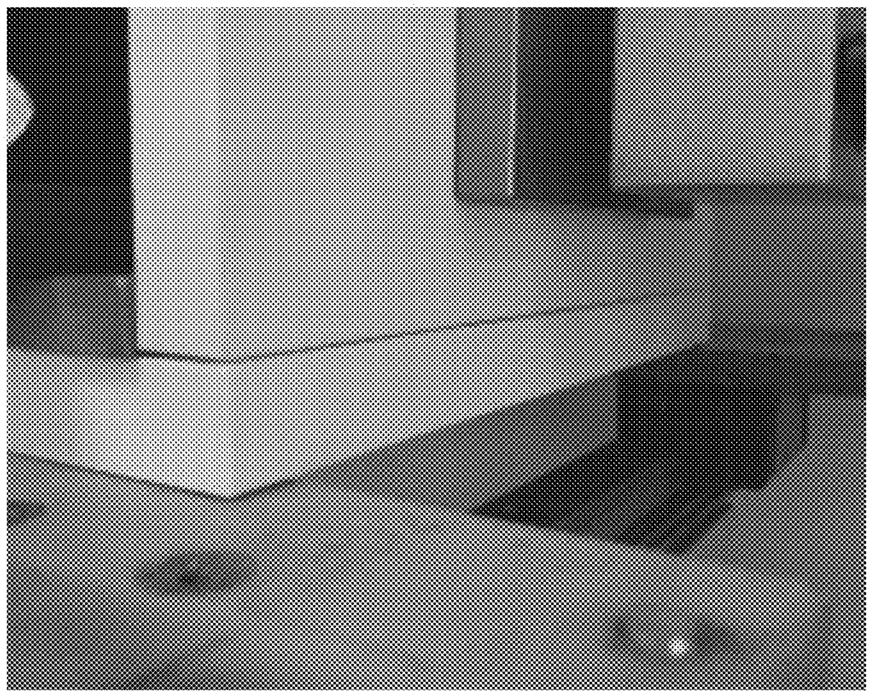

Results: In FIG. 29, the extension of the 10 samples (5 each of System 1 and System 2) is plotted against the applied force F1. The results clearly show that the extension of System 2 is lower than that of System 1, meaning that the locking is stronger when the compressible locking element is placed between the at least two dowels. In FIGS. 30 and 31, photos were taken of System 1 and System 2, respectively, with an applied force of 200 N. The comparison shows that the gap in System 2 is smaller than that of System 1.

ITEMIZED LIST OF EMBODIMENTS

1. A joinery product comprising:
a first joinery element (10) having a first edge surface (11), a second edge surface (12) and a first joinery element surface (13), wherein said second edge surface (12) is adjacent to said first edge surface (11) and wherein a first attaching surface (15) is at least part of said first edge surface (11) or said second edge surface (12);
a second joinery element (20) having a second joinery element surface (22), a third joinery element surface (23), a third edge surface (21) and a fourth edge surface (24), wherein a second attaching surface (25) is at least part of said second joinery element surface (22), the third edge surface (21) or the fourth edge surface (24), wherein the first attaching surface (15) faces and is configured to be locked with the second attaching surface (25); and
a mechanical locking device comprising:
at least two dowels (31) protruding at a first angle (a1) from the first attaching surface (15);
at least two insertion recesses (32) extending into the second attaching surface (25), said at least two insertion recesses (32) being configured to receive said at least two dowels (31);
a compressible locking element (40) positioned partially in a first joinery element recess (41) in the first attaching surface (15), wherein a side of the joinery element recess (41) extends at a third angle (a3) relative the first attaching surface (15), and wherein the compressible locking element (40) in the uncompressed state partially protrudes from first attaching surface (15); and a locking recess (50) at the second attaching surface (25) being configured to receive said compressible locking element (40), wherein a locking surface (51) of said locking recess (50) in the locked position is configured to cooperate with the compressible locking element (40) for locking of the first joinery element relative (10) to the second joinery element (20) in directions in the plane of the first attaching surface (15), wherein the inclination of said at least two dowels (31) counteracts displacement of the first joinery element (10) relative to the second joinery element (20) along the normal direction of the first attaching surface (15), wherein said compressible locking element (40) is positioned between said at least two dowels in a direction perpendicular to the normal direction, wherein the first angle (a1) is in a range of 20-75 degrees, and wherein the third angle (a3) is in a range of 70-110°.

2. The joinery product according to item 1, wherein said at least two insertion recesses (32) extend into the second attaching surface (25) at a second angle (a2) from the second attaching surface (25) and the difference between the first angle (a1) and the second angle (a2) is in a range of 0 to 6 degrees.

3. The joinery product according to item 1 or 2, wherein said compressible locking element (40) is positioned less than 30 mm, such as less than 20 mm, such as less than 10 mm, such as less than 5 mm, from a straight line between said at least two dowels (31).

4. The joinery product according to item any one of items 1 to 3, wherein the compressible locking element (40), in a flexed/compressed state, is configured to be substantially positioned in the first joinery element recess (41).

5. The joinery product according to any one of items 1 to 4, wherein the compressible locking element (40) is, in the locked position, configured to be displaced partly into the locking recess (50).

6. The joinery product according to any one of items 1 to 5, wherein at least one of the at least two insertion recesses (32), the first joinery element recess (41) and the locking recess (50) is a hole, such as a bottom ended hole, such as a bottom ended drilled hole.

7. The joinery product according to any one of items 1 to 6, further comprising:

one or more additional dowels (33) protruding at a first angle (a1) from the first attaching surface; and one or more two additional insertion recesses (34) extending into the second attaching surface (25) at a second angle (a2) from the second attaching surface (25) and being configured to receive said one or more additional dowels (33).

8. The joinery product according to any one of items 1 to 7, further comprising one or more additional compressible locking elements (40') positioned partially in an additional first joinery element recess (41'), and one or more additional locking recesses (50') at the second attaching surface (25) being configured to receive said additional compressible locking element (40').

9. The joinery product according to any one of items 1 to 8, wherein the compressible locking element (40) comprises a spring (43) and a locking pin (42).

10. The joinery product according to any of items 1 to 9, wherein one end of the compressible locking element (40) comprises the locking pin (42).

11. The joinery product according to item 9 or 10, wherein the locking pin (42) comprises an end part (47), said end part (47) having a tapered shape, such as in the shape of a truncated cone.

12. The joinery product according to any one of items 9 to 11, wherein an unlocking surface (16) is provided with an unlocking hole (49) which reaches the compressible locking element (40), wherein the compressible locking element is configured to cooperate with an unlocking device (48) through said unlocking hole (49), such that the end part (47) is displaced towards a bottom (44) of said first joinery element recess (41).

13. The joinery product according to any one of items 9 to 12, wherein the locking pin (42) comprises a radial recess (45) which optionally extends through the locking pin (42).

14. The joinery product according to item 13, wherein the opening of the radial recess (45) is larger on one side of the locking pin (42) such that there is an inner sloping surface (46) towards the other opening.

15. The joinery product according to any one of items 9 to 14, wherein the spring (43) comprises a U-shaped portion (66) and an adjacent U-shaped portion (66), wherein a leg of the U-shaped portion is connected to a leg of the adjacent U-shaped portion.

16. The joinery product according to item 15, wherein the spring (43) is configured such that two adjacent U-shaped portions (66) are closer to or contact each other in a compressed state compared to the non-compressed state.

17. The joinery product according to item 15 or 16, wherein the U-shaped portions (66) are circle segments extending over more than 180°.

18. The joinery product according to any of items 15 to 17, wherein the thickness (t) of the U-shaped portions is smaller in the legs of the U-shaped portions than the thickness (T) of the U-shape portions (66) closer to the bottom of the U-shape portions (66).

19. The joinery product according to any of items 15 to 18, wherein a shape along the spring is such that a surface circumventing the outer parts the U-shaped portions (66) is cylindrical.

20. The joinery product according to any of items 15 to 19, wherein a diameter of the cylindrical surface at non-compressed state is greater than at maximum compression of the compressible locking element (40).

21. The joinery product according to any of the items 9 to 20, wherein the end part (47) comprises a cut-out segment (70).

22. The joinery product according to item 9, wherein the spring (43) is a sequence of a first and a second elements (77, 78), each element comprising a disc-shaped part (75) and two, relative the centre of the disc-shaped part (75), opposed bridging struts (76, 79), wherein the two opposed bridging struts (76, 79) are arranged equally distanced from the centre and on the same side of the disc-shaped part (75), wherein the elements (77, 78) with said struts (76, 79) are arranged with the disc-shaped parts (75) parallel to one another, and wherein the first element (77) with the struts (76) directed towards the second element (78) is connected with said struts (76) to the second element (78), with the struts (79) of the second element (78) pointing away from the first element (77), and wherein a line between the struts (76) of the first element (77) is perpendicular to a line between the struts (79) of the second element (78), when viewed axially.

23. The joinery product according to item 22, wherein the disc-shaped parts (75) are circular.

24. The joinery product according to item 22 or 23, wherein the disc-shaped parts (75) have centrally positioned, circular openings (80).

25. The joinery product according to any one of items 22 to 24, wherein the disc-shaped parts (75) are made of a resilient material.

26. The joinery product according to any one of items 22 to 25, wherein the spring comprises at least 4 elements selected from the first and the second element (77, 78).

27. The joinery product according to any one of items 22 to 26, wherein an axial distance (81) between two adjacent disc-shaped parts (75) is larger than an axial thickness (82) of a single disc-shaped part (75).

28. The joinery product according to any one of the preceding items, wherein each dowel (31) comprises a lower side and an upper side, wherein the first angle (a1) is between the lower side and the first attaching surface (15).

29. The joinery product according to any one of the preceding items, wherein the joinery element recess (41) comprises an opposite side and a bottom surface, wherein the bottom surface extends between the side and the opposite side.

30. The joinery product according to any one of the preceding items, wherein the compressible locking element (40) is configured to be compressed against a bottom surface of the joinery element recess (41) during assembling of the first joinery element and the second joinery element.

31. A joinery product comprising:

a first joinery element (10) having a first edge surface (11), a second edge surface (12) and a first joinery element surface (13), wherein said second edge surface (12) is adjacent to said first edge surface (11) and wherein a first attaching surface (15) is at least part of said first edge surface (11) or said second edge surface (12);

a second joinery element (20) having a second joinery element surface (22), a third joinery element surface (23), a third edge surface (21) and a fourth edge surface (24), wherein a second attaching surface (25) is at least part of said second joinery element surface (22), the third edge surface (21) or the fourth edge surface (24), wherein the first attaching surface (15) faces and is configured to be locked with the second attaching surface (25); and a mechanical locking device comprising:

at least two dowels (31) protruding at a first angle (a1) from the second attaching surface (25);

at least two insertion recesses (32) extending into the first attaching surface (15), said at least two insertion recesses (32) being configured to receive said at least two dowels (31);

a compressible locking element (40) positioned partially in a first joinery element recess (41) in the first attaching surface (15), wherein a side of the joinery element recess (41) extends at a third angle (a3) relative the first attaching surface (15), and wherein the compressible locking element (40) in the uncompressed state partially protrudes from first attaching surface (15); and a locking recess (50) at the second attaching surface (25) being configured to receive said compressible locking element (40), wherein a locking surface (51) of said locking recess (50) in the locked position is configured to cooperate with the compressible locking element (40) for locking of the first joinery element relative (10) to the second joinery element (20) in directions in the plane of the first attaching surface (15), wherein the inclination of said at least two dowels (31) counteracts displacement of the first joinery element (10) relative to the second joinery element (20) along the normal direction of the first attaching surface (15), wherein said compressible locking element (40) is positioned between said at least two dowels in the locked position in a direction perpendicular to the normal direction, wherein the first angle (a1) is in a range of 20-75 degrees, and wherein the third angle (a3) is in a range of 70-110°.

32. The joinery product according to item 31, wherein said at least two insertion recesses (32) extend into the first attaching surface (15) at a second angle (a2) from the first attaching surface (15) and the difference between the first angle (a1) and the second angle (a2) is in a range of 0 to 6 degrees.

33. The joinery product according to item 31 or 32, wherein said compressible locking element (40) is positioned less than 30 mm, such as less than 20 mm, such as less than 10 mm, such as less than 5 mm, from a straight line between said at least two dowels (31), in the locked position.

34. The joinery product according to item any one of items 31 to 34, wherein the compressible locking element (40), in a flexed/compressed state, is configured to be substantially positioned in the first joinery element recess (41).

35. The joinery product according to any one of items 31 to 34, wherein the compressible locking element (40) is, in the locked position, configured to be displaced partly into the locking recess (50).

36. The joinery product according to any one of items 31 to 35, wherein at least one of the at least two insertion recesses (32), the first joinery element recess (41) and the locking recess (50) is a hole, such as a bottom ended hole, such as a bottom ended drilled hole.

37. The joinery product according to any one of items 31 to 36, further comprising:

one or more additional dowels (33) protruding at a first angle (a1) from the second attaching surface (25); and one or more two additional insertion recesses (34) extending into the first attaching surface (15) at a second angle (a2) from the first attaching surface (15) and being configured to receive said one or more additional dowels (33).

38. The joinery product according to any one of items 31 to 37, further comprising one or more additional compressible locking elements (40') positioned partially in an additional first joinery element recess (41'), and one or more additional locking recesses (50') at the second attaching surface (25) being configured to receive said additional compressible locking element (40').

The invention claimed is:

1. A joinery product comprising:

a first joinery element having a first edge surface, a second edge surface and a first joinery element surface, wherein said second edge surface is adjacent to said first edge surface and wherein a first attaching surface is at least part of said first edge surface or said second edge surface;

a second joinery element having a second joinery element surface, a third joinery element surface, a third edge surface and a fourth edge surface, wherein a second attaching surface is at least part of said second joinery element surface, the third edge surface or the fourth edge surface, wherein the first attaching surface faces and is configured to be locked with the second attaching surface; and a mechanical locking device comprising:

at least two dowels protruding at a first angle from the first attaching surface;

at least two insertion recesses extending into the second attaching surface, said at least two insertion recesses being configured to receive said at least two dowels;

a compressible locking element positioned partially in a first joinery element recess in the first attaching surface, wherein a side of the joinery element recess extends at a third angle relative the first attaching surface, and wherein the compressible locking element in the uncompressed state partially protrudes from the first attaching surface; and a locking recess at the second attaching surface being configured to receive said compressible locking element, wherein a locking surface of said locking recess in the locked position is configured to cooperate with the compressible locking element for locking of the first joinery element relative to the second joinery element in directions in the plane of the first attaching surface, wherein the inclination of said at least two dowels counteracts displacement of the first joinery element relative to the second joinery element along the normal direction of the first attaching surface, wherein said compressible locking element is positioned between said at least two dowels in a direction perpendicular to the normal direction, wherein the first angle is in a range of 20-75 degrees, and wherein the third angle is in a range of 70-110 degrees.

2. The joinery product according to claim 1, wherein said at least two insertion recesses extend into the second attaching surface at a second angle from the second attaching surface and the difference between the first angle and the second angle is in a range of 0 to 6 degrees.

3. The joinery product according to claim 1, wherein said compressible locking element is positioned less than 30 mm from a straight line between said at least two dowels.

4. The joinery product according to claim 1, wherein the compressible locking element, in a flexed/compressed state, is configured to be substantially positioned in the first joinery element recess.

5. The joinery product according to claim 1, wherein the compressible locking element is, in the locked position, configured to be displaced partly into the locking recess.

6. The joinery product according to claim 1, wherein at least one of the at least two insertion recesses, the first joinery element recess and the locking recess is a hole.

7. The joinery product according to claim 1, further comprising:

one or more additional dowels protruding at a first angle from the first attaching surface; and one or more two additional insertion recesses extending into the second attaching surface at a second angle from the second attaching surface and being configured to receive said one or more additional dowels.

8. The joinery product according to claim 1, further comprising one or more additional compressible locking elements positioned partially in an additional first joinery element recess, and one or more additional locking recesses at the second attaching surface being configured to receive said additional compressible locking element.

9. The joinery product according to claim 1, wherein the compressible locking element comprises a spring and a locking pin.

10. The joinery product according to claim 9, wherein one end of the compressible locking element comprises the locking pin.

11. The joinery product according to claim 9, wherein the locking pin comprises an end part, said end part having a tapered shape.

12. The joinery product according to claim 9, wherein an unlocking surface is provided with an unlocking hole which reaches the compressible locking element, wherein the compressible locking element is configured to cooperate with an unlocking device through said unlocking hole, such that the end part is displaced towards a bottom of said first joinery element recess.

13. The joinery product according to claim 9, wherein the compressible locking element is compressible along a main longitudinal direction of the compressible locking element, and wherein the locking pin comprises a radial recess which extends through the locking pin in a direction perpendicular to the main longitudinal direction of the compressible locking element from a first opening on one side of the locking pin to a second opening on another side of the locking pin.

14. The joinery product according to claim 13, wherein the first opening is larger than the second opening such that there is an inner sloping surface from the first opening to the second opening.

15. The joinery product according to claim 9, wherein the spring comprises a U-shaped portion and an adjacent U-shaped portion, wherein a leg of the U-shaped portion is connected to a leg of the adjacent U-shaped portion.

16. The joinery product according to claim 15, wherein the spring is configured such that two adjacent U-shaped portions are closer to or contact each other in a compressed state compared to the non-compressed state.

17. The joinery product according to claim 15, wherein the U-shaped portions are circle segments extending over more than 180 degrees.

18. The joinery product according to claim 15, wherein the thickness of the U-shaped portions is smaller in the legs of the U-shaped portions than the thickness of the U-shape portions closer to the bottom of the U-shape portions.

19. The joinery product according to claim 15, wherein a shape along the spring is such that a surface circumventing the outer parts the U-shaped portions is cylindrical.

20. The joinery product according to claim 15, wherein a diameter of the cylindrical surface at non-compressed state is greater than at maximum compression of the compressible locking element.

21. The joinery product according to claim 9, wherein the end part comprises a cut-out segment.

22. The joinery product according to claim 1, wherein each dowel comprises a lower side and an upper side, wherein the first angle is between the lower side and the first attaching surface.

23. The joinery product according to claim 1, wherein the joinery element recess comprises an opposite side and a bottom surface, wherein the bottom surface extends between the side and the opposite side.

24. The joinery product according to claim 1, wherein the compressible locking element is configured to be compressed against a bottom surface of the joinery element recess during assembling of the first joinery element and the second joinery element.

25. A joinery product comprising:

a first joinery element having a first edge surface, a second edge surface and a first joinery element surface, wherein said second edge surface is adjacent to said first edge surface and wherein a first attaching surface is at least part of said first edge surface or said second edge surface;

a second joinery element having a second joinery element surface, a third joinery element surface, a third edge surface and a fourth edge surface, wherein a second attaching surface is at least part of said second joinery element surface, the third edge surface or the fourth edge surface, wherein the first attaching surface faces and is configured to be locked with the second attaching surface; and a mechanical locking device comprising:

at least two dowels protruding at a first angle from the second attaching surface;

at least two insertion recesses extending into the first attaching surface, said at least two insertion recesses being configured to receive said at least two dowels;

a compressible locking element positioned partially in a first joinery element recess in the first attaching surface, wherein a side of the joinery element recess extends at a third angle relative the first attaching surface, and wherein the compressible locking element in the uncompressed state partially protrudes from the first attaching surface; and a locking recess at the second attaching surface being configured to receive said compressible locking element, wherein a locking surface of said locking recess in the locked position is configured to cooperate with the compressible locking element for locking of the first joinery element relative to the second joinery element in directions in the plane of the first attaching surface, wherein the inclination of said at least two dowels counteracts displacement of the first joinery element relative to the second joinery element along the normal direction of the first attaching surface, wherein said compressible locking element is positioned between said at least two dowels in the locked position in a direction perpendicular to the normal direction, wherein the first angle is in a range of 20-75 degrees, and wherein the third angle is in a range of 70-110 degrees.

26. The joinery product according to claim 25, wherein said at least two insertion recesses extend into the first attaching surface at a second angle from the first attaching surface and the difference between the first angle and the second angle is in a range of 0 to 6 degrees.

27. The joinery product according to claim 25, wherein the compressible locking element is compressible along a main longitudinal direction of the compressible locking element, wherein the compressible locking element comprises a spring and a locking pin, and wherein the locking pin comprises a radial recess which extends through the locking pin in a direction perpendicular to the main longitudinal direction of the compressible locking element from a first opening on one side of the locking pin to a second opening on another side of the locking pin.

28. The joinery product according to claim 27, wherein the first opening is larger than the second opening such that there is an inner sloping surface from the first opening to the second opening.

29. The joinery product according to claim 1, wherein a central longitudinal axis of the compressible locking element intersects the first attaching surface at a first point, wherein respective central longitudinal axes of two of the at least two dowels intersect the first attaching surface at respective second and third points, and wherein the first point is between, and colinear with, the second and third points in the direction perpendicular to the normal direction.

* * * * *